US012804700B2

(12) United States Patent
Yang et al.

(10) Patent No.: US 12,804,700 B2
(45) Date of Patent: Nov. 17, 2026

(54) COLLISION HANDLING BETWEEN SCHEDULING REQUESTS AND HYBRID AUTOMATIC REPEAT REQUEST ACKNOWLEDGMENT FEEDBACK HAVING DIFFERENT PRIORITIES

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 936 days.

(21) Appl. No.: 17/450,221

(22) Filed: Oct. 7, 2021

(65) Prior Publication Data

US 2022/0116960 A1 Apr. 14, 2022

Related U.S. Application Data

(60) Provisional application No. 63/089,938, filed on Oct. 9, 2020.

(51) Int. Cl.
*H04W 72/12* (2023.01)
*H04L 1/16* (2023.01)
(Continued)

(52) U.S. Cl.
CPC ......... *H04W 72/566* (2023.01); *H04L 1/1678* (2013.01); *H04L 5/0055* (2013.01); *H04W 72/1268* (2013.01); *H04W 72/21* (2023.01)

(58) Field of Classification Search
None
See application file for complete search history.

(56) References Cited

U.S. PATENT DOCUMENTS

2018/0352568 A1 12/2018 Kim et al.
2019/0239216 A1 8/2019 Kundu et al.
(Continued)

FOREIGN PATENT DOCUMENTS

CN 110034885 A 7/2019
WO 2019160809 A2 8/2019
(Continued)

OTHER PUBLICATIONS

International Search Report and Written Opinion—PCT/US2021/071796—ISA/EPO—Jan. 28, 2022.
(Continued)

*Primary Examiner* — Steve R Young
(74) *Attorney, Agent, or Firm* — Harrity & Harrity, LLP

(57) ABSTRACT

Various aspects of the present disclosure generally relate to wireless communication. In some aspects, a user equipment (UE) may identify a collision between one or more hybrid automatic repeat request (HARQ) acknowledgment (ACK) resources and one or more scheduling request (SR) resources having different priorities. The UE may perform an action associated with at least one of the one or more HARQ ACK resources or the one or more SR resources, wherein the action is based at least in part on at least one of: a physical uplink control channel (PUCCH) format or a priority associated with a HARQ ACK resource, or a PUCCH format or a priority associated with an SR resource. Numerous other aspects are provided.

31 Claims, 6 Drawing Sheets

(51) Int. Cl.

| | |
|---|---|
| ***H04L 1/1607*** | (2023.01) |
| ***H04L 5/00*** | (2006.01) |
| ***H04W 72/1268*** | (2023.01) |
| ***H04W 72/21*** | (2023.01) |
| ***H04W 72/566*** | (2023.01) |

(56) References Cited

U.S. PATENT DOCUMENTS

| | | | | |
|---|---|---|---|---|
| 2019/0246416 | A1* | 8/2019 | Park | H04L 1/1812 |
| 2019/0261391 | A1* | 8/2019 | Kundu | H04L 1/0073 |
| 2019/0306922 | A1* | 10/2019 | Xiong | H04W 72/21 |
| 2020/0228248 | A1* | 7/2020 | Islam | H04L 5/0055 |
| 2020/0374085 | A1* | 11/2020 | Yin | H04L 1/1671 |
| 2021/0337538 | A1* | 10/2021 | Li | H04L 5/0055 |
| 2022/0191890 | A1* | 6/2022 | Guo | H04L 5/0053 |
| 2022/0255669 | A1* | 8/2022 | Yin | H04W 72/21 |
| 2023/0164774 | A1* | 5/2023 | Fröberg Olsson | H04L 1/1861 370/329 |
| 2023/0379917 | A1* | 11/2023 | Yin | H04W 72/21 |
| 2024/0015747 | A1* | 1/2024 | Gao | H04W 72/1268 |
| 2025/0344208 | A1* | 11/2025 | Gou | H04L 5/0055 |

FOREIGN PATENT DOCUMENTS

| | | | |
|---|---|---|---|
| WO | 2019192539 | A1 | 10/2019 |
| WO | 2020204564 | A1 | 10/2020 |
| WO | WO-2020202478 | A1 | 10/2020 |

OTHER PUBLICATIONS

Ericsson: "UCI Enhancements for NR URLLC", 3GPP TSG RAN WG1 Meeting #98bis, R1-1910546, 3rd Generation Partnership Project (3GPP), vol. RAN WG1, No. Chongqing, China, Oct. 14, 2019-Oct. 20, 2019, Oct. 8, 2019, XP51789347, 8 Pages.

SAMSUNG: "Remaining Issues for UCI Enhancements", 3GPP TSG RAN WG1 #100bis, R1-2002132, 3rd Generation Partnership Project (3GPP), vol. RAN WG1, No. e-Meeting, Apr. 20, 2020-Apr. 30, 2020, Apr. 10, 2020, XP51875457, 11 Pages.

* cited by examiner

400

| | HARQ ACK: PF 0, LP | HARQ ACK: PF 1, LP | HARQ ACK: PF 0, HP | HARQ ACK: PF 1, HP |
|---|---|---|---|---|
| SR: PF 0, LP | Multiplex on HARQ ACK resource | Drop SR resource | Multiplex on HARQ ACK resource, apply a power boost to the transmission | Drop SR resource |
| SR: PF 1, LP | Multiplex on HARQ ACK resource | RB selection | Option 1 – Multiplex on the HARQ ACK resource, apply a power boost to the transmission<br>Option 2 – Drop SR resource | RB selection<br>If SR is positive, use power control parameter for HARQ ACK resource |
| SR: PF 0, HP | Option 1 – Multiplex on HARQ ACK resource, use power control parameter of SR resource<br>Option 2 – Multiplex on SR resource | Option 1- If SR is positive, use SR resource to transmit HARQ ACK; If SR is negative, use HARQ ACK resource to transmit HARQ ACK<br>Option 2 – Drop SR resource | Multiplex on HARQ ACK resource | Drop SR resource |
| SR: PF 1, HP | If SR is positive, use SR resource to transmit HARQ ACK | RB selection | Multiplex on HARQ ACK resource | RB selection |

FIG. 4

COLLISION HANDLING BETWEEN SCHEDULING REQUESTS AND HYBRID AUTOMATIC REPEAT REQUEST ACKNOWLEDGMENT FEEDBACK HAVING DIFFERENT PRIORITIES

CROSS-REFERENCE TO RELATED APPLICATION

This Patent Application claims priority to U.S. Provisional Patent Application No. 63/089,938, filed on Oct. 9, 2020, entitled "COLLISION HANDLING BETWEEN SCHEDULING REQUESTS AND HYBRID AUTOMATIC REPEAT REQUEST ACKNOWLEDGMENT FEEDBACK HAVING DIFFERENT PRIORITIES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for collision handling between scheduling requests (SRs) and hybrid automatic repeat request (HARD) acknowledgment (ACK) feedback having different priorities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a collision between one or more hybrid automatic repeat request (HARQ) acknowledgment (ACK) resources and one or more scheduling request (SR) resources, where at least one of the one or more HARQ ACK resources and at least one of the one or more SR resources have different priorities; and performing an action, to resolve the collision, associated with at least one of the one or more HARQ ACK resources or the one or more SR resources, wherein the action is based at least in part on at least one of: a physical uplink control channel (PUCCH) format or a priority associated with at least one of the one or more HARQ ACK resources, or a PUCCH format or a priority associated with at least one of the one or more SR resources.

In some aspects, a UE for wireless communication includes a memory and one or more processors coupled to the memory. The one or more processors may be configured to: identify a collision between one or more HARQ ACK resources and one or more SR resources, where at least one of the one or more HARQ ACK resources and at least one of the one or more SR resources have different priorities; and perform an action, to resolve the collision, associated with at least one of the one or more HARQ ACK resources or the one or more SR resources, wherein the action is based at least in part on at least one of: a PUCCH format or a priority associated with at least one of the one or more HARQ ACK resources, or a PUCCH format or a priority associated with at least one of the one or more SR resources.

In some aspects, a non-transitory computer-readable medium storing a set of instructions for wireless communication includes one or more instructions that, when executed by one or more processors of a UE, cause the UE to: identify a collision between one or more HARQ ACK resources and one or more SR resources, where at least one of the one or more HARQ ACK resources and at least one of the one or more SR resources have different priorities; and perform an action, to resolve the collision, associated with at least one of the one or more HARQ ACK resources or the one or more SR resources, wherein the action is based at least in part on at least one of: a PUCCH format or a priority associated with at least one of the one or more HARQ ACK resources, or a PUCCH format or a priority associated with at least one of the one or more SR resources.

In some aspects, an apparatus for wireless communication includes means for identifying a collision between one or more HARQ ACK resources and one or more SR resources, where at least one of the one or more HARQ ACK resources and at least one of the one or more SR resources have different priorities; and means for performing an action, to resolve the collision, associated with at least one of the one or more HARQ ACK resources or the one or more SR resources, wherein the action is based at least in part on at least one of: a PUCCH format or a priority associated with at least one of the one or more HARQ ACK resources, or a PUCCH format or a priority associated with at least one of the one or more SR resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3 and 4 are diagrams illustrating examples associated with collision handling between scheduling requests (SRs) and hybrid automatic repeat request (HARQ) acknowledgment (ACK) feedback having different priorities, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
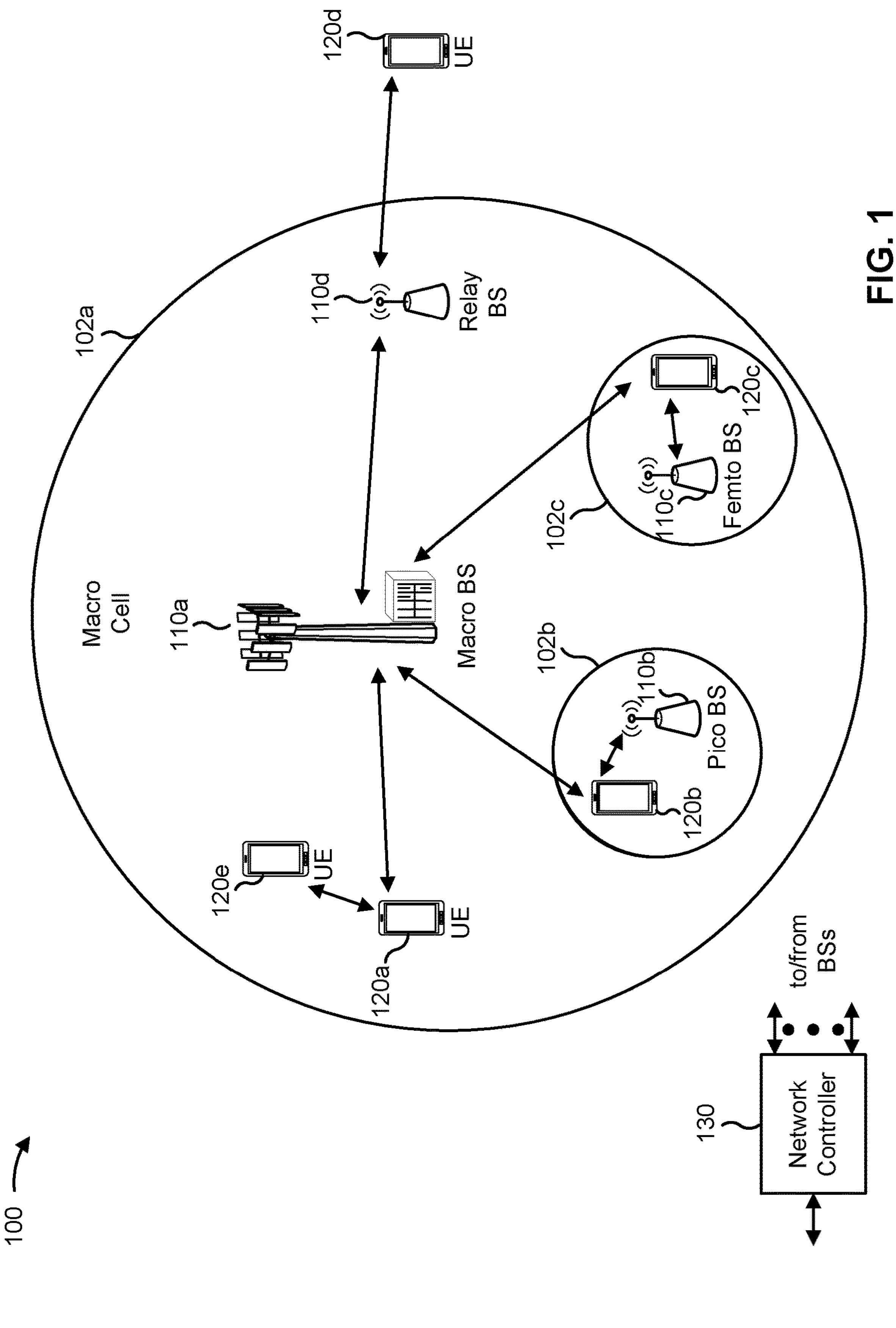
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
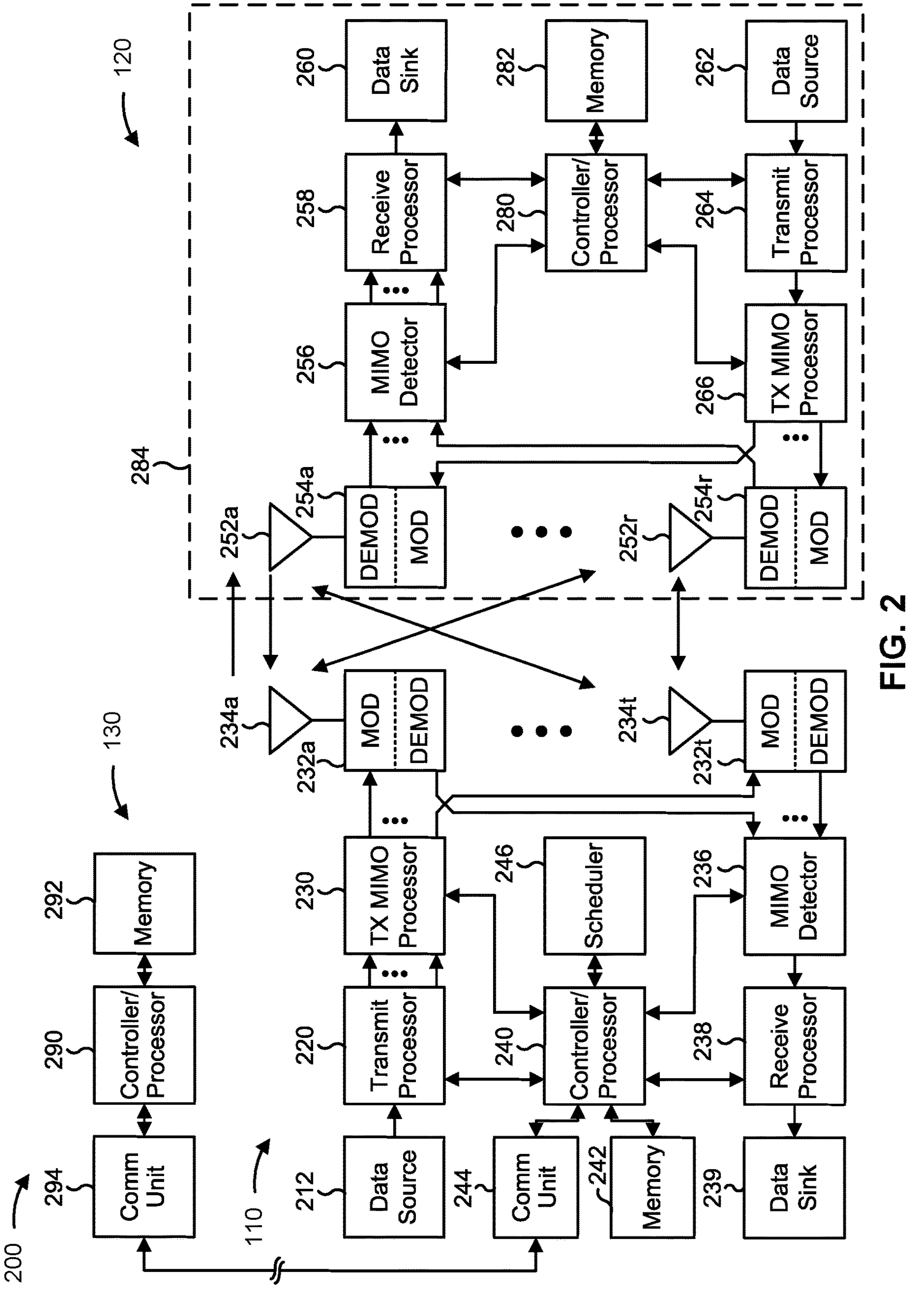
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, and/or any other component(s) of FIG. 2 may perform one or more techniques associated with collision handling between scheduling requests (SRs) and hybrid automatic repeat request (HARQ) acknowledgment (ACK) feedback having different priorities, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions, among other examples.

In some aspects, the UE 120 includes means for identifying a collision between one or more HARQ ACK resources and one or more SR resources, where at least one of the one or more HARQ ACK resources and at least one of the one or more SR resources have different priorities; means for determining an action to be performed, the action associated with at least one of the one or more HARQ ACK resources or the one or more SR resources based at least in part on at least one of: a PUCCH format or a priority associated with at least one of the one or more HARQ ACK resources, or a PUCCH format or a priority associated with at least one of the one or more SR resources; and/or means for performing the action associated with at least one of the one or more HARQ ACK resources or the one or more SR resources. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for identifying (e.g., using controller/processor 280, memory 282, and/or the like) a collision between a HARQ ACK resource, associated with a first priority and a PUCCH format, and an SR resource associated with a second priority and the PUCCH format; and/or means for determining (e.g., using controller/processor 280, memory 282, and/or the like) the action based at least in part on at least one of: whether the first priority is a higher priority than the second priority, the PUCCH format, or whether a payload of the SR resource indicates a positive SR.

In some aspects, the UE 120 includes means for identifying (e.g., using controller/processor 280, memory 282, and/or the like) a collision between a HARQ ACK resource associated with a low priority and associated with a PUCCH format 0, and an SR resource associated with a high priority and associated with a PUCCH format 0.

In some aspects, the UE 120 includes means for determining (e.g., using controller/processor 280, memory 282, and/or the like) to multiplex a payload of the HARQ ACK resource and a payload of the SR resource on the HARQ ACK resource; and/or means for determining (e.g., using controller/processor 280, memory 282, and/or the like) that a power control parameter associated with transmitting a multiplexed HARQ ACK and SR resource on the HARQ ACK resource is to be based at least in part on the SR resource. In some aspects, the UE 120 includes means for determining (e.g., using controller/processor 280, memory 282, and/or the like) a power boost value to apply to a transmission carrying a multiplexed payload that includes the payload of the HARQ ACK resource and the payload of the SR resource. In some aspects, the UE 120 includes means for multiplexing (e.g., using controller/processor 280, transmit processor 264, TX MIMO processor 266, MOD 254, antenna 252, memory 282, and/or the like) a payload of the HARQ ACK resource and a payload of the SR resource on the HARQ ACK resource; means for determining (e.g., using controller/processor 280, memory 282, and/or the like) a power control parameter based at least in part on the SR resource; and/or means for transmitting (e.g., using controller/processor 280, transmit processor 264, TX MIMO processor 266, MOD 254, antenna 252, memory 282, and/or the like), using the HARQ ACK resource and the power control parameter, a multiplexed payload that includes the payload of the HARQ ACK resource and the payload of the SR resource.

In some aspects, the UE 120 includes means for determining (e.g., using controller/processor 280, memory 282, and/or the like) a power boost value to apply to a transmission carrying the multiplexed payload; and/or means for transmitting (e.g., using controller/processor 280, transmit processor 264, TX MIMO processor 266, MOD 254, antenna 252, memory 282, and/or the like), using the HARQ ACK resource, the power control parameter, and the power boost value, the multiplexed payload.

In some aspects, the UE 120 includes means for determining (e.g., using controller/processor 280, memory 282, and/or the like) to multiplex a payload of the HARQ ACK resource and a payload of the SR resource on the SR resource. In some aspects, the UE 120 includes means for multiplexing (e.g., using controller/processor 280, transmit processor 264, TX MIMO processor 266, MOD 254, antenna 252, memory 282, and/or the like) a payload of the HARQ ACK resource and a payload of the SR resource on the SR resource; and/or means for transmitting (e.g., using controller/processor 280, transmit processor 264, TX MIMO processor 266, MOD 254, antenna 252, memory 282, and/or the like), using the SR resource, a multiplexed payload that includes the payload of the HARQ ACK resource and the payload of the SR resource.

In some aspects, the UE 120 includes means for identifying (e.g., using controller/processor 280, memory 282, and/or the like) a collision between a HARQ ACK resource associated with a low priority and associated with a PUCCH format 0, and an SR resource associated with a high priority and associated with a PUCCH format 1. In some aspects, the UE 120 includes means for determining (e.g., using controller/processor 280, memory 282, and/or the like) that a payload of the SR resource indicates a positive SR; and/or means for determining (e.g., using controller/processor 280, memory 282, and/or the like) to transmit a payload of the HARQ ACK resource on the SR resource based at least in part on determining that the payload of the SR resource indicates a positive SR. In some aspects, the UE 120 includes means for transmitting (e.g., using controller/processor 280, transmit processor 264, TX MIMO processor 266, MOD 254, antenna 252, memory 282, and/or the like), using the SR resource, a payload of the HARQ ACK resource.

In some aspects, the UE 120 includes means for identifying (e.g., using controller/processor 280, memory 282, and/or the like) a collision between a HARQ ACK resource associated with a low priority and associated with a PUCCH format 1, and an SR resource associated with a high priority and associated with a PUCCH format 0.

In some aspects, the UE 120 includes means for determining (e.g., using controller/processor 280, memory 282, and/or the like) whether a payload of the SR resource indicates a positive SR; and/or means for determining (e.g., using controller/processor 280, memory 282, and/or the like) whether to transmit a payload of the HARQ ACK resource on the HARQ ACK resource or the SR resource based at least in part on determining whether the payload of the SR resource indicates a positive SR. In some aspects, the UE 120 includes means for transmitting (e.g., using controller/processor 280, transmit processor 264, TX MIMO processor 266, MOD 254, antenna 252, memory 282, and/or the like), using the SR resource, a payload of the HARQ ACK resource based at least in part on the payload of the SR resource indicating a positive SR; or means for transmitting (e.g., using controller/processor 280, transmit processor 264, TX MIMO processor 266, MOD 254, antenna 252, memory 282, and/or the like), using the HARQ ACK resource, a payload of the HARQ ACK resource based at least in part on the payload of the SR resource indicating a negative SR.

In some aspects, the UE 120 includes means for dropping (e.g., using controller/processor 280, memory 282, and/or the like) the SR resource based at least in part on a payload of the SR resource indicating a negative SR; and/or means for transmitting (e.g., using controller/processor 280, transmit processor 264, TX MIMO processor 266, MOD 254, antenna 252, memory 282, and/or the like), using the HARQ ACK resource, a payload of the HARQ ACK resource. In some aspects, the UE 120 includes means for dropping (e.g., using controller/processor 280, memory 282, and/or the like) the SR resource; and/or means for transmitting (e.g., using controller/processor 280, transmit processor 264, TX MIMO processor 266, MOD 254, antenna 252, memory 282, and/or the like), using the HARQ ACK resource, a payload of the HARQ ACK resource.

In some aspects, the UE 120 includes means for identifying (e.g., using controller/processor 280, memory 282, and/or the like) a collision between a HARQ ACK resource associated with a high priority and associated with a PUCCH format 0, and an SR resource associated with a low priority and associated with a PUCCH format 0. In some aspects, the UE 120 includes means for determining (e.g., using controller/processor 280, memory 282, and/or the like) to multiplex a payload of the HARQ ACK resource and a payload of the SR resource on the HARQ ACK resource.

In some aspects, the UE 120 includes means for determining (e.g., using controller/processor 280, memory 282, and/or the like) a power boost value to apply to a transmission of a multiplexed payload that includes the payload of the HARQ ACK resource and the payload of the SR resource. In some aspects, the UE 120 includes means for multiplexing (e.g., using controller/processor 280, transmit processor 264, TX MIMO processor 266, MOD 254, antenna 252, memory 282, and/or the like) a payload of the HARQ ACK resource and a payload of the SR resource on the HARQ ACK resource; and/or means for transmitting (e.g., using controller/processor 280, transmit processor 264, TX MIMO processor 266, MOD 254, antenna 252, memory 282, and/or the like), using the HARQ ACK resource and applying a power boost value, a multiplexed payload that includes the payload of the HARQ ACK resource and the payload of the SR resource.

In some aspects, the UE 120 includes means for identifying (e.g., using controller/processor 280, memory 282, and/or the like) a collision between a HARQ ACK resource associated with a high priority and associated with a PUCCH format 0, and an SR resource associated with a low priority and associated with a PUCCH format 1. In some aspects, the UE 120 includes means for determining (e.g., using controller/processor 280, memory 282, and/or the like) to multiplex a payload of the HARQ ACK resource and a payload of the SR resource on the HARQ ACK resource.

In some aspects, the UE 120 includes means for determining (e.g., using controller/processor 280, memory 282, and/or the like) a power boost value to apply to a transmission of a multiplexed payload that includes the payload of the HARQ ACK resource and the payload of the SR resource. In some aspects, the UE 120 includes means for determining (e.g., using controller/processor 280, memory 282, and/or the like) to drop the SR resource.

In some aspects, the UE 120 includes means for multiplexing (e.g., using controller/processor 280, transmit processor 264, TX MIMO processor 266, MOD 254, antenna 252, memory 282, and/or the like) a payload of the HARQ ACK resource and a payload of the SR resource on the HARQ ACK resource; and/or means for transmitting (e.g., using controller/processor 280, transmit processor 264, TX MIMO processor 266, MOD 254, antenna 252, memory 282, and/or the like), using the HARQ ACK resource and applying a power boost value, a multiplexed payload that includes the payload of the HARQ ACK resource and the payload of the SR resource. In some aspects, the UE 120 includes means for dropping (e.g., using controller/processor 280, memory 282, and/or the like) the SR resource; and/or means for transmitting (e.g., using controller/processor 280, transmit processor 264, TX MIMO processor 266, MOD 254, antenna 252, memory 282, and/or the like), using the HARQ ACK resource, a payload of the HARQ ACK resource.

In some aspects, the UE 120 includes means for identifying (e.g., using controller/processor 280, memory 282, and/or the like) a collision between a HARQ ACK resource, associated with a high priority and associated with a PUCCH format 1, and an SR resource associated with a low priority and associated with a PUCCH format 1. In some aspects, the UE 120 includes means for determining (e.g., using controller/processor 280, memory 282, and/or the like) whether a payload of the SR resource indicates a positive SR; and/or means for determining (e.g., using controller/processor 280, memory 282, and/or the like) whether to transmit a payload of the HARQ ACK resource using the SR resource or the HARQ ACK resource based at least in part on whether the payload of the SR resource indicates a positive SR. In some aspects, the UE 120 includes means for determining (e.g., using controller/processor 280, memory 282, and/or the like) a power control parameter based at least in part on the HARQ ACK resource; and/or means for transmitting (e.g., using controller/processor 280, transmit processor 264, TX MIMO processor 266, MOD 254, antenna 252, memory 282, and/or the like), using the SR resource and the power control parameter, a payload of the HARQ ACK resource based at least in part on a payload of the SR resource indicating a positive SR.

In some aspects, the UE 120 includes means for identifying (e.g., using controller/processor 280, memory 282, and/or the like) a collision between: a first HARQ ACK resource associated with a low priority, a second HARQ ACK resource associated with a high priority, and an SR resource associated with the high priority. In some aspects, the UE 120 includes means for determining (e.g., using controller/processor 280, memory 282, and/or the like) to multiplex, on the second HARQ ACK resource, a payload of the first HARQ ACK resource and a payload of the second HARQ ACK resource; means for determining that the second HARQ ACK resource that includes a multiplexed payload is associated with the high priority; and/or means for determining (e.g., using controller/processor 280, memory 282, and/or the like) an action to be performed associated with the second HARQ ACK resource, that includes a multiplexed payload, and the SR resource based at least in part on determining that the second HARQ ACK resource that includes the multiplexed payload is associated with the high priority. In some aspects, the UE 120 includes means for multiplexing (e.g., using controller/processor 280, transmit processor 264, TX MIMO processor 266, MOD 254, antenna 252, memory 282, and/or the like) a payload of the first HARQ ACK resource and a payload of the second HARQ ACK resource on the second HARQ ACK resource; and/or means for performing (e.g., using controller/processor 280, transmit processor 264, TX MIMO processor 266, MOD 254, antenna 252, memory 282, and/or the like) an action associated with at least one of the second HARQ ACK resource or the SR resource based at least in part on a PUCCH format associated with the second HARQ ACK resource and a PUCCH format associated with the SR resource.

In some aspects, the UE 120 includes means for identifying (e.g., using controller/processor 280, memory 282, and/or the like) a collision between: a first HARQ ACK resource associated with a low priority, a second HARQ ACK resource associated with a high priority, and an SR resource associated with the low priority. In some aspects, the UE 120 includes means for determining (e.g., using controller/processor 280, memory 282, and/or the like) to multiplex, on the second HARQ ACK resource, a payload of the first HARQ ACK resource and a payload of the second HARQ ACK resource; means for determining (e.g., using controller/processor 280, memory 282, and/or the like) that the second HARQ ACK resource that includes a multiplexed payload is associated with the high priority; and/or means for determining (e.g., using controller/processor 280, memory 282, and/or the like) an action to be performed associated with the second HARQ ACK resource, that includes a multiplexed payload, and the SR resource based at least in part on determining that the second HARQ ACK resource that includes the multiplexed payload is associated with the high priority.

In some aspects, the UE 120 includes means for multiplexing (e.g., using controller/processor 280, transmit processor 264, TX MIMO processor 266, MOD 254, antenna 252, memory 282, and/or the like) a payload of the first HARQ ACK resource and a payload of the second HARQ ACK resource on the second HARQ ACK resource; and/or means for performing (e.g., using controller/processor 280, transmit processor 264, TX MIMO processor 266, MOD 254, antenna 252, memory 282, and/or the like) an action associated with at least one of the second HARQ ACK resource or the SR resource based at least in part on a PUCCH format associated with the second HARQ ACK resource and a PUCCH format associated with the SR resource.

In some aspects, the UE 120 includes means for identifying (e.g., using controller/processor 280, memory 282, and/or the like) a collision between: a HARQ ACK resource, associated with a PUCCH format 0 or associated with a PUCCH format 1, a first SR resource associated with a high priority, and a second SR resource associated with a low priority. In some aspects, the UE 120 includes means for determining (e.g., using controller/processor 280, memory 282, and/or the like) whether a payload of the first SR resource indicates a positive SR or a negative SR; and/or means for determining (e.g., using controller/processor 280, memory 282, and/or the like) an action to be performed associated with a payload of the HARQ ACK resource and the payload of the first SR resource, or with the payload of the HARQ ACK resource and a payload of the second SR resource, based at least in part on determining whether the payload of the first SR resource indicates a positive SR or a negative SR. In some aspects, the UE 120 includes means for determining (e.g., using controller/processor 280, memory 282, and/or the like) to drop the second SR resource; and/or means for determining (e.g., using controller/processor 280, memory 282, and/or the like) an action to be performed associated with at least one of the HARQ ACK resource and the first SR resource based at least in part on a PUCCH format associated with the first SR resource.

In some aspects, the UE 120 includes means for performing (e.g., using controller/processor 280, transmit processor 264, TX MIMO processor 266, MOD 254, antenna 252, memory 282, and/or the like) an action associated with a payload of the HARQ ACK resource and a payload of the second SR resource based at least in part on a payload of the first SR resource indicating a negative SR; or means for performing (e.g., using controller/processor 280, transmit processor 264, TX MIMO processor 266, MOD 254, antenna 252, memory 282, and/or the like) an action associated with the payload of the HARQ ACK resource and the payload of the first SR resource based at least in part on the payload of the first SR resource indicating a positive SR. In some aspects, the UE 120 includes means for dropping (e.g., using controller/processor 280, memory 282, and/or the like) the second SR resource; and/or means for performing (e.g., using controller/processor 280, transmit processor 264, TX MIMO processor 266, MOD 254, antenna 252, memory 282, and/or the like) an action associated with a payload of the HARQ ACK resource and a payload of the first SR resource.

In some aspects, the UE 120 includes means for identifying (e.g., using controller/processor 280, memory 282, and/or the like) a collision between: a HARQ ACK resource, where the HARQ ACK resource is associated with a PUCCH format 2, associated with a PUCCH format 3, or associated with a PUCCH format 4, and at least one of: one or more SR resources associated with a high priority, or one or more SR resources associated with a low priority.

In some aspects, the UE 120 includes means for determining (e.g., using controller/processor 280, memory 282, and/or the like) whether a payload of an SR resource, of the one or more SR resources associated with a high priority, indicates a positive SR; and/or means for determining (e.g., using controller/processor 280, memory 282, and/or the like) to append information to a payload of the HARQ ACK resource to indicate a payload of the one or more SR resources associated with the high priority or the one or more SR resources associated with the low priority based at least in part on determining whether a payload of an SR resource, of the one or more SR resources associated with the high priority, indicates a positive SR. In some aspects, the UE 120 includes means for determining (e.g., using controller/processor 280, memory 282, and/or the like) a size of the information based at least in part on a quantity of resources included in the one or more SR resources associated with the high priority and the one or more SR resources associated with the low priority.

In some aspects, the UE 120 includes means for appending (e.g., using controller/processor 280, memory 282, and/or the like) information, indicating a payload of any positive SRs included in the one or more SR resources associated with the high priority, to a payload of the HARQ ACK resource, based at least in part on at least one payload of the one or more SR resources associated with the high priority indicating a positive SR; or means for appending (e.g., using controller/processor 280, memory 282, and/or the like) information, indicating a payload of any positive SRs included in the one or more SR resources associated with the low priority, to a payload of the HARQ ACK resource based at least in part on no payloads of the one or more SR resources associated with the high priority indicating a positive SR.

In some aspects, the UE 120 includes means for transmitting (e.g., using controller/processor 280, transmit processor 264, TX MIMO processor 266, MOD 254, antenna 252, memory 282, and/or the like), using the HARQ ACK resource, the payload of the HARQ ACK resource appended with the information indicating a payload of any positive SRs included in the one or more SR resources associated with the high priority, or the information indicating a payload of any positive SRs included in the one or more SR resources associated with the low priority.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some cases, a UE 120 may be configured with one or more HARQ ACK configurations and one or more SR configurations. A HARQ ACK configuration may indicate one or more HARQ ACK resources (e.g., time domain and/or frequency domain resources) that the UE 120 is to use to transmit ACK or negative ACK (NACK) feedback to a base station 110. An SR configuration may indicate one or more SR resources that the UE 120 is to use to transmit SRs (e.g., a request for a scheduling grant) to a base station 110. In some cases, a HARQ ACK resource and an SR resource may collide (e.g., at least partially overlap in the time domain).

When a HARQ ACK resource and an SR resource collide, the UE 120 may perform an action to resolve the collision based at least in part on a PUCCH format associated with the HARQ ACK resource and a PUCCH format associated with the SR resource. A "collision" of a HARQ ACK resource and an SR resource may refer to an overlap (e.g., at least a partial overlap) in the time domain between one or more resources associated with the HARQ ACK resource and one or more resources associated with the SR resource. Moreover, a HARQ ACK resource may overlap in the time domain (e.g., collide) with a positive SR resource (e.g., an SR resource that includes a positive SR) or a negative SR resource (e.g., an SR resource that includes a negative SR).

A PUCCH format may include a PUCCH format 0 (a short PUCCH format for payloads of 1 or 2 bits), a PUCCH format 1 (a long PUCCH format for payloads of 1 or 2 bits), a PUCCH format 2 (a short PUCCH format for payloads greater than 2 bits), a PUCCH format 3 (a long PUCCH format for payloads greater than 2 bits), and a PUCCH format 4 (a long PUCCH format for payloads greater than 2 bits). The PUCCH formats (e.g., PUCCH format 0, PUCCH format 1, PUCCH format 2, PUCCH format 3, and PUCCH format 4) may be defined, or otherwise fixed, by a wireless communication standard, such as a 3GPP standard.

For example, if the HARQ ACK resource is associated with a PUCCH format 0, the UE 120 may multiplex a payload of the HARQ ACK resource and a payload of the SR resource on the HARQ ACK resource. As used herein, a "payload" of the HARQ ACK resource may refer to information bits associated with the HARQ ACK resource. As used herein, a "payload" of the SR resource may refer to the SR (e.g., a positive SR or a negative SR). The UE 120 may multiplex the payload of the HARQ ACK resource and the payload of the SR resource by performing one or more cyclic shifts to differentiate the payload of the HARQ ACK resource and the payload of the SR resource. For example, if the payload of the HARQ ACK resource is one bit and the payload of the SR resource is one bit, then the UE 120 may perform four cyclic shifts. If the payload of the HARQ ACK resource is two bits and the payload of the SR resource is one bit, then the UE 120 may perform eight cyclic shifts.

If the HARQ ACK resource is associated with a PUCCH format 1 and the SR resource is associated with a PUCCH format 1, the UE 120 may perform a resource block (RB) selection procedure to resolve the collision. The RB selection procedure may include determining whether a payload of the SR resource is to include a positive SR or a negative SR. If the payload of the SR resource is to include an SR, then the UE 120 may transmit the payload of the HARQ ACK resource using the SR resource. If the payload of the SR resource does not include an SR (e.g., a negative SR), then the UE 120 may transmit the payload of the HARQ ACK resource using the HARQ ACK resource. In this way, the base station 110 may determine which the SR is a positive SR or a negative SR based at least in part on whether the HARQ ACK is transmitted using the SR resource (e.g., indicating a positive SR) or the HARQ ACK resource (e.g., indicating a negative SR).

If the HARQ ACK resource is associated with a PUCCH format 1 and the SR resource is associated with a PUCCH format 0, the UE 120 may drop (e.g., not transmit) the SR resource. As used herein, "drop" or "dropping" may refer to the UE 120 not transmitting a resource. The UE 120 may transmit the payload of the HARQ ACK resource using the HARQ ACK resource.

If the HARQ ACK resource is associated with a PUCCH format 2, 3 or 4, the UE 120 may determine a number of SR resources that overlap with the HARQ ACK resource. The UE 120 may append information to the payload of the HARQ ACK resource. A size of the information may correspond to the number of SR resources that collide with the HARQ ACK resource. For example, a number of bits of the information may correspond to $N=\log_2(K+1)$, where N is the number of bits and K is the number of SR resources that collide with the HARQ ACK resource. In some aspects, from the above, the UE 120 may identify a payload of an SR resource that is to include an SR (a positive SR). In such cases, the SR may consume one bit (or one codepoint) of the information that is appended to the payload of the HARQ ACK resource.

In some cases, a HARQ ACK resource and/or an SR resource may be associated with a priority (e.g., a high priority or a low priority). In some cases, the priority may be based at least in part on type of traffic associated with the resource. For example, a resource (e.g., a HARQ ACK resource and/or an SR resource) may be associated with a high priority when the resource is to be used to transmit high priority traffic (e.g., ultra-reliable low-latency communication (URLLC) traffic or other high priority traffic). Similarly, a resource may be associated with a low priority when the resource is to be used to transmit low priority traffic (e.g., Enhanced Mobile Broadband (eMBB) traffic or other low priority traffic). A low priority resource may be associated with a lower transmit configuration (e.g., lower transmit power and/or less MIMO layers, among other examples) than a high priority resource.

In some cases, if a HARQ ACK resource and an SR resource with the same priority collide, the UE 120 may resolve the collision in a similar manner as described above (e.g., based at least in part on the PUCCH formats associated with the HARQ ACK resource and the SR resource). However, if a HARQ ACK resource and an SR resource with different priorities collide, the UE 120 may resolve the collision by dropping the lower priority resource (e.g., the HARQ ACK resource or the SR resource) and transmitting the higher priority resource. As a result, lower priority resources (e.g., low priority HARQ ACK resources and/or low priority SR resources) may be dropped due to the collisions (e.g., the overlap) with higher priority resources. This may trigger a retransmission of the low priority downlink communications from the base station 110 due to the corresponding low priority HARQ ACK feedback being dropped by the UE 120, thereby consuming resources associated with the retransmissions. Moreover, this may cause the UE 120 to miss a low priority SR, causing the UE 120 to retransmit the low priority SR (e.g., thereby consuming resources associated with the retransmission) and/or increasing latency associated with receive a scheduling grant from the base station 110.

Some techniques and apparatuses described herein enable collision handling between SR resources and HARQ ACK resources having different priorities. The UE 120 may determine (and/or receive an indication of) an action to perform when an SR resource and a HARQ ACK resource having different priorities collide. For example, the UE 120 may multiplex a payload of the SR resource and a payload of the HARQ ACK, perform an RB selection procedure, and/or determine transmit powers (e.g., a transmit power control parameter and/or a power boost value) based at least in part on the priorities associated with the SR resource and the HARQ ACK resource and a PUCCH format associated with the SR resource and the HARQ ACK resource. As a result, the UE 120 may be enabled to transmit (e.g., not drop) payloads of lower priority resources (e.g., low priority HARQ ACK resources and/or low priority SR resources) when the lower priority resources collide with higher priority resources. This may conserve UE resources by reducing a number of retransmissions required. Moreover, this may increase reliability and reduce latency by enabling the UE 120 to transmit (e.g., not drop) payloads of lower priority resources when the lower priority resources collide with higher priority resources.

Figure 3:
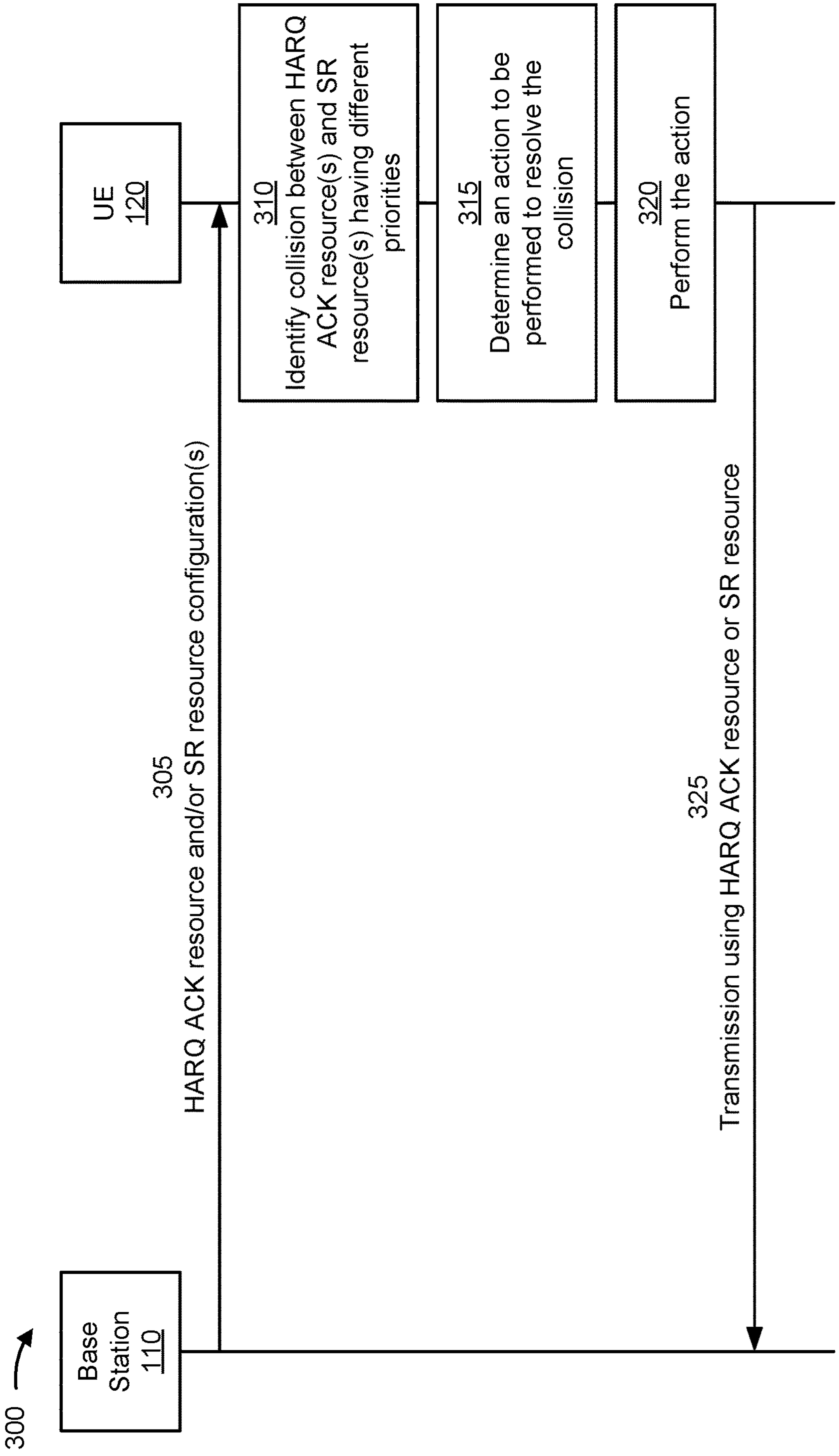

FIG. 3 is a diagram illustrating an example 300 associated with collision handling between SRs and HARQ ACK feedback having different priorities, in accordance with the present disclosure. As shown in FIG. 3, example 300 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink.

As shown by reference number 305, the base station 110 may transmit, and the UE 120 may receive, one or more HARQ ACK resource configurations and/or one or more SR resource configurations. For example, the base station 110 may configure the UE 120 with one or more resources (e.g., HARQ ACK resources) for the UE 120 to transmit ACK/NACK feedback associated with downlink communications from the UE 120. In some aspects, the HARQ ACK resources may be periodic (e.g., associated with semi-persistent scheduling (SPS) downlink communications) or dynamic (e.g., associated with dynamic downlink communications). For example, the UE 120 may be configured with one or more periodic HARQ ACK resources and/or one or more dynamic HARQ ACK resources. Similarly, the base station 110 may configure the UE 120 with one or more resources (e.g., SR resources) for the UE 120 to transmit SRs to the base station 110. In some aspects, a resource may be referred to as an occasion. For example, an SR resource may be referred to as an SR occasion (e.g., an opportunity for the UE 120 to transmit an SR).

As shown by reference number 310, the UE 120 may identify a collision between one or more HARQ ACK resources and one or more SR resources having different priorities (e.g., where at least one resource has a different priority than the other resource(s) associated with the collision). As described above, "collision" may refer to an overlap between two or more resources (e.g., HARQ ACK resource(s) and/or SR resource(s)) in the time domain.

As shown by reference number 315, the UE 120 may determine an action to be performed to resolve the collision. For example, the UE 120 may determine an action associated with at least one of the one or more HARQ ACK resources or the one or more SR resources based at least in part on at least one of a PUCCH format or a priority associated with at least one of the one or more HARQ ACK resources, or a PUCCH format or a priority associated with at least one of the one or more SR resources. For example, the UE 120 may identify a collision between a HARQ ACK resource, associated with a first priority and a PUCCH format, and an SR resource associated with a second priority and the PUCCH format. The UE 120 may determine the action based at least in part on whether the first priority is a higher priority than the second priority, the PUCCH format, and/or whether a payload of the SR resource indicates a positive SR, among other examples.

In some aspects, the UE 120 may determine the action based at least in part on an indication from the base station 110. For example, the base station 110 may determine a set of rules (e.g., a set of actions, such as the actions described herein in connection with FIGS. 3 and 4) to be followed by the UE 120 to resolve collisions between HARQ ACK resource(s) and SR resource(s) having different priorities.

The base station 110 may transmit, and the UE 120 may receive, the set of rules. Therefore, as described herein, an action described as being determined by the UE 120 may be determined by the base station 110 in a similar manner.

In some aspects, where the UE 120 identifies a collision between a 1 bit or a 2 bit HARQ ACK resource and a 1 bit SR resource that have different priorities, the UE 120 may determine the action based at least in part on a set of rules. The set of rules are described in more detail in connection with FIG. 4. In some aspects, the action may include multiplexing a payload of the HARQ ACK resource and a payload of the SR resource on the HARQ ACK resource or the SR resource. In some aspects, the action may include using the SR resource to transmit the HARQ ACK resource (e.g., when the payload of the SR resource indicates a positive SR). In some aspects, the action may include determining a power control parameter (e.g., a closed-loop power control parameter and/or an open-loop power control parameter) based at least in part on the high priority resource (e.g., the high priority HARQ ACK resource or the high priority SR resource). In some aspects, the action may include determining a power boost value to apply to a multiplexed transmission (e.g., that includes a payload of the HARQ ACK resource and a payload of the SR resource).

In some aspects, where the UE 120 identifies a collision between more than 2 resources, the UE 120 may determine a first action to be performed prior to following one or more of the rules described in connection with FIG. 4 to determine a second action. For example, if the UE 120 identifies a collision between a low priority HARQ ACK resource (e.g., a 1 bit HARQ ACK resource), a high priority HARQ ACK resource (e.g., a 1 bit HARQ ACK resource), and a high priority SR resource, then the UE 120 may determine that a payload of the low priority HARQ ACK resource and a payload of the high priority HARQ ACK resource are to be multiplexed on the high priority HARQ ACK resource (e.g., using one or more cyclic shifts to create a 2 bit payload on the high priority HARQ ACK resource). The UE 120 may determine that the high priority HARQ ACK resource that includes the multiplexed payload (e.g., a multiplexed high priority and low priority HARQ-ACK payload) is associated with the high priority. Although the example above is described assuming two priority levels (e.g., high priority or low priority), this example may apply to a scenario in which the UE 120 is configured with more than two priority levels. The UE 120 may multiplex a payload of a first HARQ ACK resource having a first priority and a payload of a second HARQ ACK resource having a second priority on the HARQ ACK resource associated with the highest priority (e.g., between the first priority and the second priority). For example, if the first priority is a higher priority than the second priority, the UE 120 may multiplex the payload of the first HARQ ACK resource and the payload of the second HARQ ACK resource on the first HARQ ACK resource. Additionally, the UE 120 may determine that the first HARQ ACK resource that includes the multiplexed payload is associated with the first priority (e.g., the highest priority among the colliding HARQ ACK resources).

The UE 120 may determine an action to be performed with the high priority HARQ ACK resource (that includes the multiplexed payload) and the high priority SR resources based at least in part on one or more of the rules described in connection with FIG. 4. For example, the UE 120 may determine the action based at least in part on the PUCCH format associated with the high priority HARQ ACK resource and the PUCCH format associated with the high priority SR resource.

In some aspects, if the UE 120 identifies a collision between a low priority HARQ ACK resource (e.g., a 1 bit HARQ ACK resource), a high priority HARQ ACK resource (e.g., a 1 bit HARQ ACK resource), and a low priority SR resource, then the UE 120 may determine that a payload of the low priority HARQ ACK resource and a payload of the high priority HARQ ACK resource are to be multiplexed on the high priority HARQ ACK resource, as described above. The UE 120 may determine that the high priority HARQ ACK resource that includes the multiplexed payload is associated with the high priority. As described above, the UE 120 may be configured with more than two priority levels. In that case, the UE 120 may multiplex the colliding HARQ ACK resources on the highest priority HARQ ACK resources. Additionally, the UE 120 may determine that the multiplexed HARQ ACK resource is associated with the highest priority among the colliding HARQ ACK resources.

The UE 120 may determine an action to be performed with the high priority HARQ ACK resource (that includes the multiplexed payload) and the low priority SR resource based at least in part on one or more of the rules described in connection with FIG. 4. For example, the UE 120 may determine the action based at least in part on the PUCCH format associated with the high priority HARQ ACK resource and the PUCCH format associated with the low priority SR resource.

In some aspects, if the UE 120 identifies a collision between a HARQ ACK resource (associated with a PUCCH format 0 or a PUCCH format 1), a high priority SR resource, and a low priority SR resource, then the UE 120 may determine an action to be performed associated with the HARQ ACK resource and the high priority SR resource, or associated with the HARQ ACK resource and the low priority SR resource. For example, the UE 120 may determine whether a payload of the high priority SR resource indicates a positive SR or a negative SR. If the payload of the high priority SR resource indicates a positive SR, then the UE 120 may determine an action to be performed associated with the HARQ ACK resource and the high priority SR resource based at least in part on one or more of the rules described in connection with FIG. 4 (e.g., regardless of whether a payload of the low priority SR resource indicates a positive SR or a negative SR). In some aspects, if the payload of the high priority SR resource indicates a positive SR, then the UE 120 may drop (e.g., not transmit) the low priority SR resource. If the payload of the high priority SR resource indicates a negative SR, then the UE 120 may determine an action to be performed associated with the HARQ ACK resource and the low priority SR resource based at least in part on one or more of the rules described in connection with FIG. 4.

In some aspects, the UE 120 may determine that the action includes dropping the low priority SR resource (e.g., regardless of whether the payload of the high priority SR resource indicates a positive SR or a negative SR). The UE 120 may determine an action to be performed associated with the HARQ ACK resource and the high priority SR resource based at least in part on one or more of the rules described in connection with FIG. 4. By always dropping the low priority SR resource in the above scenario, a number of blind detection hypotheses at the base station 110 may be reduced, thereby increasing a reliability of a detection of the high priority SR resource and/or the HARQ ACK resource at the base station 110.

In some aspects, if the UE 120 identifies a collision between a HARQ ACK resource associated with a PUCCH format associated with more than 2 bits (e.g., a PUCCH format 2, a PUCCH format 3, or a PUCCH format 4) and one or more SR resources, the UE 120 may determine information (e.g., associated with the one or more SR resources) to append to a payload of the HARQ ACK resource. For example, if the multiple SR resources includes one or more high priority SR resources, the UE 120 may determine if a payload of one or more of the high priority SR resources indicates a positive SR. If any of the high priority SR resources are associated with a positive SR, then the information appended to the payload of the HARQ ACK resource may be associated with (e.g., may correspond to or may indicate) the high priority SR resource(s) associated with a positive SR. If none of the high priority SR resources (or if none of the one or more SR resources are high priority SR resources) are associated with a positive SR, then the information appended to the payload of the HARQ ACK resource may be associated with (e.g., may correspond to or may indicate) the low priority SR resource(s) associated with a positive SR (e.g., if any exist). In some aspects, the UE 120 may determine a size of the information (e.g., a number of bits) based at least in part on the number of the one or more SR resources that collide with the HARQ ACK resource. For example, the one or more SR resources may include K1 high priority SR resources and K2 low priority SR resources (in some aspects, a value of K1 or K2 may be zero). A number of bits of the information may correspond to $N=\log_2(K+1)$, where N is the number of bits and K is equal to K1+K2. In other words, the number of bits of the information may correspond to $N=\log_2(1+K1+K2)$. In some aspects, N may be a maximum number of bits associated with the information.

As shown by reference number 320, the UE 120 may perform the action to resolve the collision between the one or more HARQ ACK resources and the one or more SR resources having different priorities. For example, the UE 120 may perform one or more of the actions described above and/or one or more of the actions described in connection with FIG. 4 to resolve the collision. For example, the UE 120 may multiplex a payload of a high priority HARQ ACK resource and a payload of a low priority HARQ ACK resource (e.g., when the high priority HARQ ACK resource and the low priority HARQ ACK resource collide with an SR resource). In some aspects, the UE 120 may drop a low priority SR resource. In some aspects, the UE 120 may append information to a payload of a HARQ ACK resource.

As shown by reference number 325, the UE 120 may transmit a communication using a HARQ ACK resource or an SR resource associated with the identified collision. For example, the UE 120 may transmit a multiplexed payload on a HARQ ACK resource or on an SR resource. In some aspects, the UE 120 may transmit a payload of a HARQ ACK resource using an SR resource (e.g., to indicate that the SR resource is a positive SR). In some aspects, the UE 120 may transmit a payload of a HARQ ACK resource using a HARQ ACK resource (e.g., to indicate that the SR resource is a negative SR).

In some aspects, the UE 120 may determine a power control parameter (e.g., an open-loop power control parameter and/or a closed loop power control parameter) for the transmission based at least in part on a high priority resource associated with the collision. For example, the UE 120 may transmit the communication using a low priority HARQ ACK resource, but may determine a power control parameter for the transmission on the low priority HARQ ACK resource using the power control parameter associated with a high priority SR resource that collides with the low priority HARQ ACK resource. The UE 120 may transmit on the low priority HARQ ACK resource in accordance with the power control parameter associated with the high priority SR resource. As the high priority resource (e.g., the SR resource in the example above) may be associated with a higher transmit power, determining the power control parameter using the high priority resource may increase a transmit power of the communication, thereby increasing a reliability of the communication.

In some aspects, the UE 120 may determine a power boost value to apply to the transmission of the communication to increase a transmit power of the communication. For example, the UE 120 may determine a power boost value to apply to a transmission of a communication that carries a multiplexed payload. The UE 120 may apply the power boost value when transmitting the communication to increase a transmit power of the communication, thereby increasing a reliability of the communication.

As indicated above, FIG. 3 is provided as an example. Other examples may differ from what is described with respect to FIG. 3.

FIG. 4 is a diagram illustrating an example 400 of collision handling between SRs and HARQ ACK feedback having different priorities, in accordance with the present disclosure. FIG. 4 depicts an example set of rules associated with resolving collisions between a HARQ ACK resource and an SR resource. For example, the table depicted in FIG. 4 may provide rules for resolving a collision between a HARQ ACK resource associated with a first priority and an SR resource associated with a second priority.

As shown in FIG. 4, if a HARQ ACK resource associated with a PUCCH format (PF) 0 and a low priority (LP) collides with a low priority SR resource (e.g., associated with PUCCH format 0 or PUCCH format 1), then the UE 120 may multiplex a payload of the HARQ ACK resource and a payload of the SR resource on the HARQ ACK resource. The UE 120 may transmit the multiplexed payload using the HARQ ACK resource.

In some aspects, the rules depicted in FIG. 4 may apply to HARQ ACK resources have a size of 1 bit or 2 bits and to SR resources having a size of 1 bit. In some aspects, the rules depicted in FIG. 4 may apply after the UE 120 performs a first action (e.g., when there is a collision between more than two resources, as described above in connection with FIG. 3). In some aspects, the rules depicted in FIG. 4 may be indicated to the UE 120 by the base station 110. For example, the base station 110 may configure the UE 120 with the rules depicted in FIG. 4. In some aspects, the UE 120 may determine the rules depicted in FIG. 4 (e.g., based at least in part on a pre-configuration of the UE 120, or otherwise).

The rules described herein in connection with FIG. 4 are provided merely as examples. The UE 120 may follow one or more (or a combination of) the following rules to resolve a collision between one or more HARQ ACK resource and one or more SR resources. Additionally, or alternatively, the UE 120 may perform one or more of the actions described in connection with FIG. 3 to resolve one or more HARQ ACK resource and one or more SR resources. In some aspects, the UE 120 may follow one or more (or a combination of) the following rules as a part of an action to resolve a collision between one or more HARQ ACK resource and one or more SR resources (e.g., the UE 120 may perform one or more additional actions in combination with following one or more of the following rules to resolve a collision). In some aspects, if a HARQ ACK resource associated with a PUCCH format 0 and a low priority collides with an SR resource associated with a PUCCH format 0 and a high priority, then the UE 120 may multiplex a payload of the HARQ ACK resource and a payload of the SR resource on the HARQ ACK resource (option 1 depicted in FIG. 4). The UE 120 may determine a power control parameter (e.g., a closed-loop power control parameter and/or an open-loop power control parameter) for transmitting the HARQ ACK resource based at least in part on the SR resource (e.g., as the SR resource is associated with a high priority and, therefore, a higher transmit power). In some aspects, the UE 120 may determine a power boost value to apply to the HARQ ACK resource in addition to, or alternatively to, determining the power control parameter based at least in part on the SR resource. The UE 120 may transmit the HARQ ACK resource (carrying the multiplexed payload) using the power control parameter and/or the power boost value.

In some aspects, if a HARQ ACK resource associated with a PUCCH format 0 and a low priority collides with an SR resource associated with a PUCCH format 0 and a high priority, then the UE 120 may multiplex a payload of the HARQ ACK resource and a payload of the SR resource on the SR resource (option 2 depicted in FIG. 4), regardless of whether the payload of the SR resource indicates a positive SR or a negative SR. The UE 120 may determine a transmit power for the SR resource (carrying the multiplexed payload) based at least in part on the SR resource.

In some aspects, if a HARQ ACK resource associated with a PUCCH format 0 and a low priority collides with an SR resource associated with a PUCCH format 1 and a high priority, then the UE 120 may determine whether a payload of the SR resource indicates a positive SR. If the payload of the SR resource indicates a positive SR, then the UE 120 may transmit a payload of the HARQ ACK resource using the SR resource (e.g., to indicate that the SR resource is associated with a positive SR). If the payload of the SR resource indicates a negative SR, then the UE 120 may transmit a payload of the HARQ ACK resource using the HARQ ACK resource (e.g., to indicate that the SR resource is associated with a negative SR). If the UE 120 transmits the payload of the HARQ ACK resource using the SR resource, then the UE 120 may determine a transmit power (e.g., a power control parameter) for the transmission based at least in part on transmit power associated with the SR resource.

In some aspects, if a HARQ ACK resource associated with a PUCCH format 1 and a low priority collides with an SR resource associated with a PUCCH format 0 and a low priority, then the UE 120 may drop the SR resource. The UE 120 may transmit a payload of the HARQ ACK resource using the HARQ ACK resource.

In some aspects, if a HARQ ACK resource associated with a PUCCH format 1 and a low priority collides with an SR resource associated with a PUCCH format 1 and a low priority, then the UE 120 may perform an RB selection procedure to resolve the collision. For example, if a payload of the SR resource indicates a positive SR, the UE 120 may transmit a payload of the HARQ ACK resource using the SR resource. If the payload of the SR resource indicates a negative SR, the UE 120 may transmit a payload of the HARQ ACK resource using the HARQ ACK resource.

In some aspects, if a HARQ ACK resource associated with a PUCCH format 1 and a low priority collides with an SR resource associated with a PUCCH format 0 and a high priority, then the UE 120 may determine whether a payload of the SR resource indicates a positive SR. If the payload of the SR resource indicates a positive SR, then the UE 120 may transmit a payload of the HARQ ACK resource using the SR resource (e.g., to indicate that the SR resource is associated with a positive SR). If the payload of the SR resource indicates a negative SR, then the UE 120 may transmit a payload of the HARQ ACK resource using the HARQ ACK resource (e.g., to indicate that the SR resource is associated with a negative SR). If the UE 120 transmits the payload of the HARQ ACK resource using the SR resource, then the UE 120 may determine a transmit power (e.g., a power control parameter) for the transmission based at least in part on the transmit power associated with the SR resource.

In some aspects, if the HARQ ACK resource associated with a PUCCH format 1 and a low priority collides with an SR resource associated with a PUCCH format 0 and a high priority, then the UE 120 may drop the SR resource, regardless of whether the payload of the SR resource indicates a positive or negative SR resource (e.g., option 2 depicted in FIG. 4). The UE 120 may transmit the payload of the HARQ ACK resource using the HARQ ACK resource.

In some aspects, if a HARQ ACK resource associated with a PUCCH format 1 and a low priority collides with an SR resource associated with a PUCCH format 1 and a high priority, then the UE 120 may perform an RB selection procedure to resolve the collision. For example, if a payload of the SR resource indicates a positive SR, the UE 120 may transmit a payload of the HARQ ACK resource using the SR resource. If the payload of the SR resource indicates a negative SR, the UE 120 may transmit a payload of the HARQ ACK resource using the HARQ ACK resource. The UE 120 may determine a transmit power (e.g., a power control parameter) based at least in part on the resource used (e.g., the HARQ ACK resource or the SR resource) for the transmission.

In some aspects, if a HARQ ACK resource associated with a PUCCH format 0 and a high priority collides with an SR resource associated with a PUCCH format 0 and a low priority, then the UE 120 may multiplex a payload of the HARQ ACK resource and a payload of the SR resource on the HARQ ACK resource. In some aspects, the UE 120 may determine a power boost value to apply to the transmission of the HARQ ACK resource carrying the multiplexed payload. The UE 120 may transmit the multiplexed payload using the HARQ ACK resource. In some aspects, the UE 120 may apply the power boost value to the transmit power of the transmission of the HARQ ACK resource.

In some aspects, if a HARQ ACK resource associated with a PUCCH format 0 and a high priority collides with an SR resource associated with a PUCCH format 1 and a low priority, then the UE 120 may multiplex a payload of the HARQ ACK resource and a payload of the SR resource on the HARQ ACK resource (e.g., option 1 depicted in FIG. 4). In some aspects, the UE 120 may determine a power boost value to apply to the transmission of the HARQ ACK resource carrying the multiplexed payload. The UE 120 may transmit the multiplexed payload using the HARQ ACK resource. In some aspects, the UE 120 may apply the power boost value to the transmit power of the transmission of the HARQ ACK resource.

In some aspects, if a HARQ ACK resource associated with a PUCCH format 0 and a high priority collides with an SR resource associated with a PUCCH format 1 and a low priority, then the UE 120 may drop the SR resource, regardless of whether the payload of the SR resource indicates a positive or negative SR resource (e.g., option 2 depicted in FIG. 4). The UE 120 may transmit the payload of the HARQ ACK resource using the HARQ ACK resource.

In some aspects, if a HARQ ACK resource associated with a PUCCH format 0 and a high priority collides with an SR resource associated with a PUCCH format 0 and a high priority, then the UE 120 may multiplex a payload of the HARQ ACK resource and a payload of the SR resource on the HARQ ACK resource. The UE 120 may transmit the multiplexed payload using the HARQ ACK resource.

In some aspects, if a HARQ ACK resource associated with a PUCCH format 0 and a high priority collides with an SR resource associated with a PUCCH format 1 and a high priority, then the UE 120 may multiplex a payload of the HARQ ACK resource and a payload of the SR resource on the HARQ ACK resource. The UE 120 may transmit the multiplexed payload using the HARQ ACK resource.

In some aspects, if a HARQ ACK resource associated with a PUCCH format 1 and a high priority collides with an SR resource associated with a PUCCH format 0 and a low priority, then the UE 120 may drop the SR resource. The UE 120 may transmit a payload of the HARQ ACK resource using the HARQ ACK resource.

In some aspects, if a HARQ ACK resource associated with a PUCCH format 1 and a high priority collides with an SR resource associated with a PUCCH format 1 and a low priority, then the UE 120 may perform an RB selection procedure to resolve the collision. For example, if a payload of the SR resource indicates a positive SR, the UE 120 may transmit a payload of the HARQ ACK resource using the SR resource. If the payload of the SR resource indicates a negative SR, the UE 120 may transmit a payload of the HARQ ACK resource using the HARQ ACK resource. The UE 120 may determine a transmit power (e.g., a power control parameter) based at least in part on the resource used (e.g., the HARQ ACK resource or the SR resource) for the transmission. In some aspects, if the payload of the SR resource indicates a positive SR, the UE 120 may determine a power control parameter (e.g., a closed-loop power control parameter and/or an open-loop power control parameter) for a transmission of the payload of the HARQ ACK resource on the SR resource based at least in part on the HARQ ACK resource (e.g., the UE 120 may determine a transmit power for transmitting the SR resource using the transmit power associated with the HARQ ACK resource). In this way, a transmit power of the low priority SR resource may be based at least in part on the high priority HARQ ACK resource, thereby increasing a transmit power of the transmission and increasing a reliability of the transmission.

In some aspects, if a HARQ ACK resource associated with a PUCCH format 1 and a high priority collides with an SR resource associated with a PUCCH format 0 and a high priority, then the UE 120 may drop the SR resource. The UE 120 may transmit a payload of the HARQ ACK resource using the HARQ ACK resource.

In some aspects, if a HARQ ACK resource associated with a PUCCH format 1 and a high priority collides with an SR resource associated with a PUCCH format 1 and a high priority, then the UE 120 may perform an RB selection procedure to resolve the collision. For example, if a payload of the SR resource indicates a positive SR, the UE 120 may transmit a payload of the HARQ ACK resource using the SR resource. If the payload of the SR resource indicates a negative SR, the UE 120 may transmit a payload of the HARQ ACK resource using the HARQ ACK resource. The UE 120 may determine a transmit power (e.g., a power control parameter) based at least in part on the resource used (e.g., the HARQ ACK resource or the SR resource) for the transmission.

Although examples above (in connection with FIG. 3 and/or FIG. 4) have been described with respect to two priority levels (e.g., high priority and low priority), the examples may similarly apply to a scenario in which the UE 120 is configured with more than two priority levels. In the case where the UE 120 is configured with more than two priority levels, "high priority," as used herein, may refer to a higher priority among the colliding resources. Similarly, "low priority," as used herein, may refer to a lower priority among the colliding resources.

As a result, the UE 120 may be enabled to transmit (e.g., not drop) payloads of lower priority resources (e.g., low priority HARQ ACK resources and/or low priority SR resources) when the lower priority resources collide with higher priority resources. This may conserve UE resources by reducing a number of retransmissions required. Moreover, this may increase reliability and reduce latency by enabling the UE 120 to transmit (e.g., not drop) payloads of lower priority resources when the lower priority resources collide with higher priority resources.

As indicated above, FIG. 4 is provided as an example. Other examples may differ from what is described with respect to FIG. 4.

Figure 5:
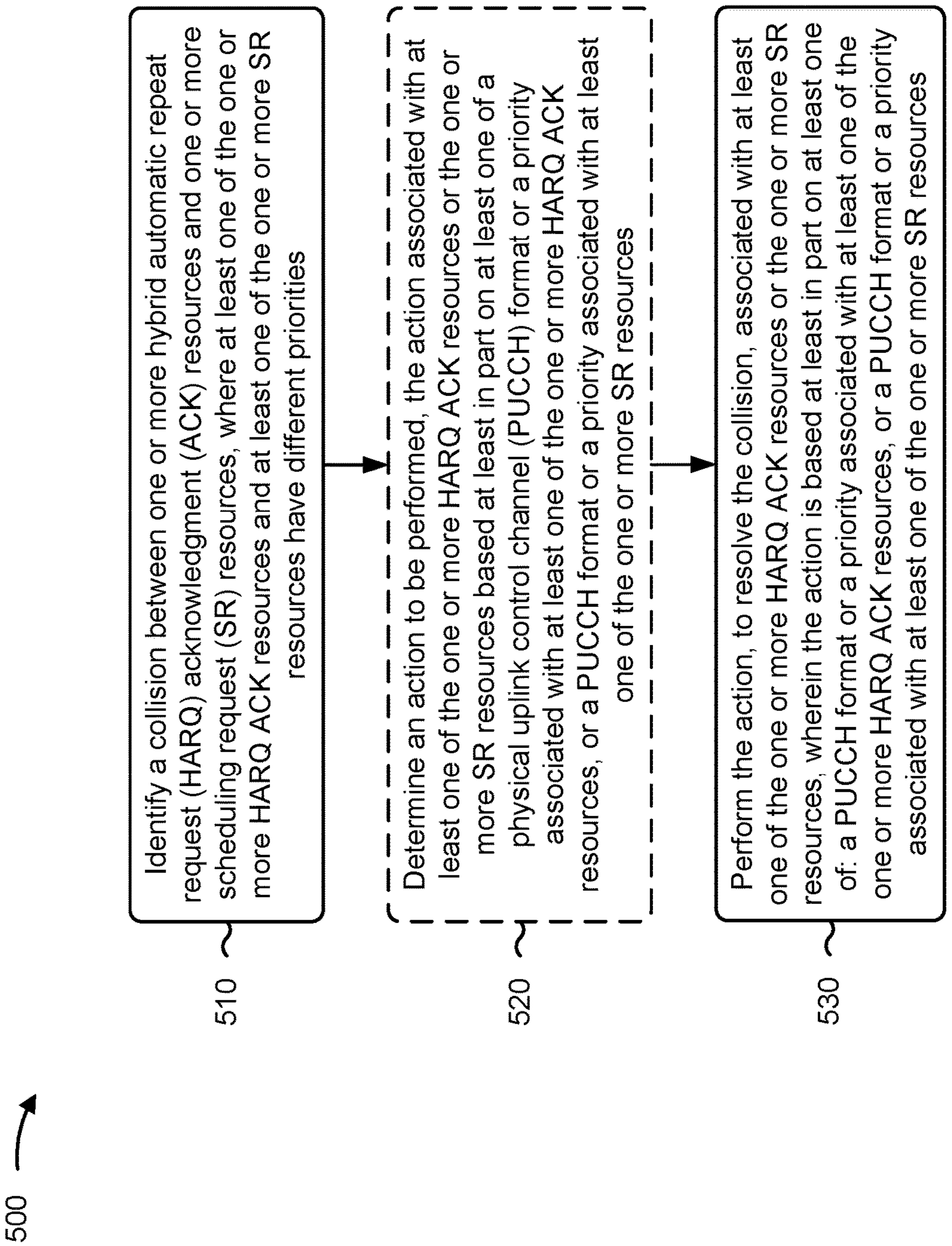
FIG. 5 is a diagram illustrating an example process associated with collision handling between SRs and HARQ ACK feedback having different priorities, in accordance with the present disclosure.

FIG. 5 is a diagram illustrating an example process 500 performed, for example, by a UE, in accordance with the present disclosure. Example process 500 is an example where the UE (e.g., UE 120) performs operations associated with collision handling between SRs and HARQ ACK feedback having different priorities.

As shown in FIG. 5, in some aspects, process 500 may include identifying a collision between one or more HARQ ACK resources and one or more SR resources, where at least one of the one or more HARQ ACK resources and at least one of the one or more SR resources have different priorities (block 510). For example, the UE (e.g., using collision identification component 608, depicted in FIG. 6) may identify a collision between one or more HARQ ACK resources and one or more SR resources, where at least one of the one or more HARQ ACK resources and at least one of the one or more SR resources have different priorities, as described above.

As further shown in FIG. 5, in some aspects, process 500 may optionally include determining an action to be performed, the action associated with at least one of the one or more HARQ ACK resources or the one or more SR resources based at least in part on at least one of: a PUCCH format or a priority associated with at least one of the one or more HARQ ACK resources, or a PUCCH format or a priority associated with at least one of the one or more SR resources (block 520). For example, the UE (e.g., using determination component 610, depicted in FIG. 6) may determine an action to be performed, the action associated with at least one of the one or more HARQ ACK resources or the one or more SR resources based at least in part on at least one of: a PUCCH format or a priority associated with at least one of the one or more HARQ ACK resources, or a PUCCH format or a priority associated with at least one of the one or more SR resources, as described above.

As further shown in FIG. 5, in some aspects, process 500 may include performing the action, to resolve the collision, associated with at least one of the one or more HARQ ACK resources or the one or more SR resources, wherein the action is based at least in part on at least one of: a PUCCH format or a priority associated with at least one of the one or more HARQ ACK resources, or a PUCCH format or a priority associated with at least one of the one or more SR resources (block 530). For example, the UE (e.g., using collision handling component 612, depicted in FIG. 6) may perform the action, to resolve the collision, associated with at least one of the one or more HARQ ACK resources or the one or more SR resources, wherein the action is based at least in part on at least one of: a PUCCH format or a priority associated with at least one of the one or more HARQ ACK resources, or a PUCCH format or a priority associated with at least one of the one or more SR resources, as described above.

Process 500 may include additional aspects, such as any single aspect or any combination of aspects described below and/or in connection with one or more other processes described elsewhere herein.

In a first aspect, identifying the collision between the one or more HARQ ACK resources and the one or more SR resources includes identifying a collision between a HARQ ACK resource, associated with a first priority and a PUCCH format, and an SR resource associated with a second priority and the PUCCH format, and determining the action to be performed associated with at least one of the one or more HARQ ACK resources or the one or more SR resources includes determining the action based at least in part on at least one of whether the first priority is a higher priority than the second priority, the PUCCH format, or whether a payload of the SR resource indicates a positive SR.

In a second aspect, alone or in combination with the first aspect, identifying the collision between the one or more HARQ ACK resources and the one or more SR resources includes identifying a collision between a HARQ ACK resource associated with a low priority and associated with a PUCCH format 0, and an SR resource associated with a high priority and associated with a PUCCH format 0.

In a third aspect, alone or in combination with one or more of the first and second aspects, determining the action to be performed associated with at least one of the one or more HARQ ACK resources or the one or more SR resources includes determining to multiplex a payload of the HARQ ACK resource and a payload of the SR resource on the HARQ ACK resource, and determining that a power control parameter associated with transmitting a multiplexed HARQ ACK and SR resource on the HARQ ACK resource is to be based at least in part on the SR resource.

In a fourth aspect, alone or in combination with one or more of the first through third aspects, the power control parameter includes at least one of an open-loop power control parameter or a closed-loop power control parameter.

In a fifth aspect, alone or in combination with one or more of the first through fourth aspects, determining the action to be performed associated with at least one of the one or more HARQ ACK resources or the one or more SR resources includes determining a power boost value to apply to a transmission carrying a multiplexed payload that includes the payload of the HARQ ACK resource and the payload of the SR resource.

In a sixth aspect, alone or in combination with one or more of the first through fifth aspects, performing the action associated with at least one of the one or more HARQ ACK resources or the one or more SR resources includes multiplexing a payload of the HARQ ACK resource and a payload of the SR resource on the HARQ ACK resource, determining a power control parameter based at least in part on the SR resource, and transmitting, using the HARQ ACK resource and the power control parameter, a multiplexed payload that includes the payload of the HARQ ACK resource and the payload of the SR resource.

In a seventh aspect, alone or in combination with one or more of the first through sixth aspects, performing the action associated with at least one of the one or more HARQ ACK resources or the one or more SR resources includes determining a power boost value to apply to a transmission carrying the multiplexed payload, and transmitting, using the HARQ ACK resource, the power control parameter, and the power boost value, the multiplexed payload.

In an eighth aspect, alone or in combination with one or more of the first through seventh aspects, determining the action to be performed associated with at least one of the one or more HARQ ACK resources or the one or more SR resources includes determining to multiplex a payload of the HARQ ACK resource and a payload of the SR resource on the SR resource.

In a ninth aspect, alone or in combination with one or more of the first through eighth aspects, performing the action associated with at least one of the one or more HARQ ACK resources or the one or more SR resources includes multiplexing a payload of the HARQ ACK resource and a payload of the SR resource on the SR resource, and transmitting, using the SR resource, a multiplexed payload that includes the payload of the HARQ ACK resource and the payload of the SR resource.

In a tenth aspect, alone or in combination with one or more of the first through ninth aspects, identifying the collision between the one or more HARQ ACK resources and the one or more SR resources includes identifying a collision between a HARQ ACK resource associated with a low priority and associated with a PUCCH format 0, and an SR resource associated with a high priority and associated with a PUCCH format 1.

In an eleventh aspect, alone or in combination with one or more of the first through tenth aspects, determining the action to be performed associated with at least one of the one or more HARQ ACK resources or the one or more SR resources includes determining that a payload of the SR resource indicates a positive SR, and determining to transmit a payload of the HARQ ACK resource on the SR resource based at least in part on determining that the payload of the SR resource indicates a positive SR.

In a twelfth aspect, alone or in combination with one or more of the first through eleventh aspects, performing the action associated with at least one of the one or more HARQ ACK resources or the one or more SR resources includes transmitting, using the SR resource, a payload of the HARQ ACK resource.

In a thirteenth aspect, alone or in combination with one or more of the first through twelfth aspects, identifying the collision between the one or more HARQ ACK resources and the one or more SR resources includes identifying a collision between a HARQ ACK resource associated with a low priority and associated with a PUCCH format 1, and an SR resource associated with a high priority and associated with a PUCCH format 0.

In a fourteenth aspect, alone or in combination with one or more of the first through thirteenth aspects, determining the action to be performed associated with at least one of the one or more HARQ ACK resources or the one or more SR resources includes determining whether a payload of the SR resource indicates a positive SR, and determining whether to transmit a payload of the HARQ ACK resource on the HARQ ACK resource or the SR resource based at least in part on determining whether the payload of the SR resource indicates a positive SR.

In a fifteenth aspect, alone or in combination with one or more of the first through fourteenth aspects, performing the action associated with at least one of the one or more HARQ ACK resources or the one or more SR resources includes transmitting, using the SR resource, a payload of the HARQ ACK resource based at least in part on the payload of the SR resource indicating a positive SR, or transmitting, using the HARQ ACK resource, a payload of the HARQ ACK resource based at least in part on the payload of the SR resource indicating a negative SR.

In a sixteenth aspect, alone or in combination with one or more of the first through fifteenth aspects, performing the action associated with at least one of the one or more HARQ ACK resources or the one or more SR resources includes dropping the SR resource, and transmitting, using the HARQ ACK resource, a payload of the HARQ ACK resource.

In a seventeenth aspect, alone or in combination with one or more of the first through sixteenth aspects, performing the action associated with at least one of the one or more HARQ ACK resources or the one or more SR resources includes dropping the SR resource, and transmitting, using the HARQ ACK resource, a payload of the HARQ ACK resource.

In an eighteenth aspect, alone or in combination with one or more of the first through seventeenth aspects, identifying the collision between the one or more HARQ ACK resources and the one or more SR resources includes identifying a collision between a HARQ ACK resource associated with a high priority and associated with a PUCCH format 0, and an SR resource associated with a low priority and associated with a PUCCH format 0.

In a nineteenth aspect, alone or in combination with one or more of the first through eighteenth aspects, determining the action to be performed associated with at least one of the one or more HARQ ACK resources or the one or more SR resources includes determining to multiplex a payload of the HARQ ACK resource and a payload of the SR resource on the HARQ ACK resource.

In a twentieth aspect, alone or in combination with one or more of the first through nineteenth aspects, determining the action to be performed associated with at least one of the one or more HARQ ACK resources or the one or more SR resources includes determining a power boost value to apply to a transmission of a multiplexed payload that includes the payload of the HARQ ACK resource and the payload of the SR resource.

In a twenty-first aspect, alone or in combination with one or more of the first through twentieth aspects, performing the action associated with at least one of the one or more HARQ ACK resources or the one or more SR resources includes multiplexing a payload of the HARQ ACK resource and a payload of the SR resource on the HARQ ACK resource, and transmitting, using the HARQ ACK resource and applying a power boost value, a multiplexed payload that includes the payload of the HARQ ACK resource and the payload of the SR resource.

In a twenty-second aspect, alone or in combination with one or more of the first through twenty-first aspects, identifying the collision between the one or more HARQ ACK resources and the one or more SR resources includes identifying a collision between a HARQ ACK resource associated with a high priority and associated with a PUCCH format 0, and an SR resource associated with a low priority and associated with a PUCCH format 1.

In a twenty-third aspect, alone or in combination with one or more of the first through twenty-second aspects, determining the action to be performed associated with at least one of the one or more HARQ ACK resources or the one or more SR resources includes determining to multiplex a payload of the HARQ ACK resource and a payload of the SR resource on the HARQ ACK resource.

In a twenty-fourth aspect, alone or in combination with one or more of the first through twenty-third aspects, determining the action to be performed associated with at least one of the one or more HARQ ACK resources or the one or more SR resources includes determining a power boost value to apply to a transmission of a multiplexed payload that includes the payload of the HARQ ACK resource and the payload of the SR resource.

In a twenty-fifth aspect, alone or in combination with one or more of the first through twenty-fourth aspects, determining the action to be performed associated with at least one of the one or more HARQ ACK resources or the one or more SR resources includes determining to drop the SR resource.

In a twenty-sixth aspect, alone or in combination with one or more of the first through twenty-fifth aspects, performing the action associated with at least one of the one or more HARQ ACK resources or the one or more SR resources includes multiplexing a payload of the HARQ ACK resource and a payload of the SR resource on the HARQ ACK resource, and transmitting, using the HARQ ACK resource and applying a power boost value, a multiplexed payload that includes the payload of the HARQ ACK resource and the payload of the SR resource.

In a twenty-seventh aspect, alone or in combination with one or more of the first through twenty-sixth aspects, performing the action associated with at least one of the one or more HARQ ACK resources or the one or more SR resources includes dropping the SR resource, and transmitting, using the HARQ ACK resource, a payload of the HARQ ACK resource.

In a twenty-eighth aspect, alone or in combination with one or more of the first through twenty-seventh aspects, identifying the collision between the one or more HARQ ACK resources and the one or more SR resources includes identifying a collision between a HARQ ACK resource, associated with a high priority and associated with a PUCCH format 1, and an SR resource associated with a low priority and associated with a PUCCH format 1.

In a twenty-ninth aspect, alone or in combination with one or more of the first through twenty-eighth aspects, determining the action to be performed associated with at least one of the one or more HARQ ACK resources or the one or more SR resources includes determining whether a payload of the SR resource indicates a positive SR, and determining whether to transmit a payload of the HARQ ACK resource using the SR resource or the HARQ ACK resource based at least in part on whether the payload of the SR resource indicates a positive SR.

In a thirtieth aspect, alone or in combination with one or more of the first through twenty-ninth aspects, performing the action associated with at least one of the one or more HARQ ACK resources or the one or more SR resources includes determining a power control parameter based at least in part on the HARQ ACK resource, and transmitting, using the SR resource and the power control parameter, a payload of the HARQ ACK resource based at least in part on a payload of the SR resource indicating a positive SR.

In a thirty-first aspect, alone or in combination with one or more of the first through thirtieth aspects, the power control parameter includes at least one of an open-loop power control parameter or a closed-loop power control parameter.

In a thirty-second aspect, alone or in combination with one or more of the first through thirty-first aspects, identifying the collision between the one or more HARQ ACK resources and the one or more SR resources includes identifying a collision between a first HARQ ACK resource associated with a low priority, a second HARQ ACK resource associated with a high priority, and an SR resource associated with the high priority.

In a thirty-third aspect, alone or in combination with one or more of the first through thirty-second aspects, determining the action to be performed associated with at least one of the one or more HARQ ACK resources or the one or more SR resources includes determining to multiplex, on the second HARQ ACK resource, a payload of the first HARQ ACK resource and a payload of the second HARQ ACK resource, determining that the second HARQ ACK resource that includes a multiplexed payload is associated with the high priority, and determining an action to be performed associated with the second HARQ ACK resource, that includes a multiplexed payload, and the SR resource based at least in part on associating the multiplexed payload with the high priority.

In a thirty-fourth aspect, alone or in combination with one or more of the first through thirty-third aspects, performing the action associated with at least one of the one or more HARQ ACK resources or the one or more SR resources includes multiplexing a payload of the first HARQ ACK resource and a payload of the second HARQ ACK resource on the second HARQ ACK resource, and performing an action associated with at least one of the second HARQ ACK resource or the SR resource based at least in part on a PUCCH format associated with the second HARQ ACK resource and a PUCCH format associated with the SR resource.

In a thirty-fifth aspect, alone or in combination with one or more of the first through thirty-fourth aspects, identifying the collision between the one or more HARQ ACK resources and the one or more SR resources includes identifying a collision between a first HARQ ACK resource associated with a low priority, a second HARQ ACK resource associated with a high priority, and an SR resource associated with the low priority.

In a thirty-sixth aspect, alone or in combination with one or more of the first through thirty-fifth aspects, determining the action to be performed associated with at least one of the one or more HARQ ACK resources or the one or more SR resources includes determining to multiplex, on the second HARQ ACK resource, a payload of the first HARQ ACK resource and a payload of the second HARQ ACK resource, determining that the second HARQ ACK resource that includes a multiplexed payload is associated with the high priority, and determining an action to be performed associated with the second HARQ ACK resource, that includes a multiplexed payload, and the SR resource based at least in part on associating the multiplexed payload with the high priority.

In a thirty-seventh aspect, alone or in combination with one or more of the first through thirty-sixth aspects, performing the action associated with at least one of the one or more HARQ ACK resources or the one or more SR resources includes multiplexing a payload of the first HARQ ACK resource and a payload of the second HARQ ACK resource on the second HARQ ACK resource, and performing an action associated with at least one of the second HARQ ACK resource or the SR resource based at least in part on a PUCCH format associated with the second HARQ ACK resource and a PUCCH format associated with the SR resource.

In a thirty-eighth aspect, alone or in combination with one or more of the first through thirty-seventh aspects, identifying the collision between the one or more HARQ ACK resources and the one or more SR resources includes identifying a collision between a HARQ ACK resource, associated with a PUCCH format 0 or associated with a PUCCH format 1, a first SR resource associated with a high priority, and a second SR resource associated with a low priority.

In a thirty-ninth aspect, alone or in combination with one or more of the first through thirty-eighth aspects, determining the action to be performed associated with at least one of the one or more HARQ ACK resources or the one or more SR resources includes determining whether a payload of the first SR resource indicates a positive SR or a negative SR, and determining an action to be performed associated with a payload of the HARQ ACK resource and the payload of the first SR resource, or with the payload of the HARQ ACK resource and a payload of the second SR resource, based at least in part on determining whether the payload of the first SR resource indicates a positive SR or a negative SR.

In a fortieth aspect, alone or in combination with one or more of the first through thirty-ninth aspects, determining the action to be performed associated with at least one of the one or more HARQ ACK resources or the one or more SR resources includes determining to drop the second SR resource, and determining an action to be performed associated with at least one of the HARQ ACK resource and the first SR resource based at least in part on a PUCCH format associated with the first SR resource.

In a forty-first aspect, alone or in combination with one or more of the first through fortieth aspects, performing the action associated with at least one of the one or more HARQ ACK resources or the one or more SR resources includes performing an action associated with a payload of the HARQ ACK resource and a payload of the second SR resource based at least in part on a payload of the first SR resource indicating a negative SR, or performing an action associated with the payload of the HARQ ACK resource and the payload of the first SR resource based at least in part on the payload of the first SR resource indicating a positive SR.

In a forty-second aspect, alone or in combination with one or more of the first through forty-first aspects, performing the action associated with at least one of the one or more HARQ ACK resources or the one or more SR resources includes dropping the second SR resource, and performing an action associated with a payload of the HARQ ACK resource and a payload of the first SR resource.

In a forty-third aspect, alone or in combination with one or more of the first through forty-second aspects, identifying the collision between the one or more HARQ ACK resources and the one or more SR resources includes identifying a collision between a HARQ ACK resource, where the HARQ ACK resource is associated with a PUCCH format 2, associated with a PUCCH format 3, or associated with a PUCCH format 4, and at least one of one or more SR resources associated with a high priority, or one or more SR resources associated with a low priority.

In a forty-fourth aspect, alone or in combination with one or more of the first through forty-third aspects, determining the action to be performed associated with at least one of the one or more HARQ ACK resources or the one or more SR resources includes determining whether a payload of an SR resource, of the one or more SR resources associated with a high priority, indicates a positive SR, and determining to append information to a payload of the HARQ ACK resource to indicate a payload of the one or more SR resources associated with the high priority or the one or more SR resources associated with the low priority based at least in part on determining whether a payload of an SR resource, of the one or more SR resources associated with the high priority, indicates a positive SR.

In a forty-fifth aspect, alone or in combination with one or more of the first through forty-fourth aspects, process 500 includes determining a size of the information based at least in part on a quantity of resources included in the one or more SR resources associated with the high priority and the one or more SR resources associated with the low priority.

In a forty-sixth aspect, alone or in combination with one or more of the first through forty-fifth aspects, performing the action associated with at least one of the one or more HARQ ACK resources or the one or more SR resources includes appending information, indicating a payload of any positive SRs included in the one or more SR resources associated with the high priority, to a payload of the HARQ ACK resource based at least in part on at least one payload of the one or more SR resources associated with the high priority indicating a positive SR, or appending information, indicating a payload of any positive SRs included in the one or more SR resources associated with the low priority, to a payload of the HARQ ACK resource based at least in part on no payloads of the one or more SR resources associated with the high priority indicating a positive SR.

In a forty-seventh aspect, alone or in combination with one or more of the first through forty-sixth aspects, performing the action associated with at least one of the one or more HARQ ACK resources or the one or more SR resources includes transmitting, using the HARQ ACK resource, the payload of the HARQ ACK resource appended with the information indicating a payload of any positive SRs included in the one or more SR resources associated with the high priority, or the information indicating a payload of any positive SRs included in the one or more SR resources associated with the low priority.

In a forty-eighth aspect, alone or in combination with one or more of the first through forty-seventh aspects, the collision is between a HARQ ACK resource associated with a low priority and associated with a PUCCH format 0, and an SR resource associated with a high priority and associated with a PUCCH format 1; and wherein the action to be performed associated with at least one of the one or more HARQ ACK resources or the one or more SR resources includes transmitting a payload of the HARQ ACK resource on the HARQ ACK resource based at least in part on a payload of the SR resource indicating a negative SR; and dropping the SR resource based at least in part on the payload of the SR resource indicating the negative SR.

In a forty-ninth aspect, alone or in combination with one or more of the first through forty-eighth aspects, the collision is between a HARQ ACK resource, associated with a PUCCH format 0 or associated with a PUCCH format 1, a first SR resource associated with a high priority, and a second SR resource associated with a low priority; and wherein performing the action associated with at least one of the one or more HARQ ACK resources or the one or more SR resources includes dropping the second SR resource based at least in part on a payload of the first SR resource indicating a positive SR.

In a fiftieth aspect, alone or in combination with one or more of the first through forty-ninth aspects, performing the action associated with at least one of the one or more HARQ ACK resources or the one or more SR resources comprises: appending information, associated with at least one SR resource of the one or more SR resources, to a payload of the HARQ ACK resource, wherein a maximum number of bits of the information is based at least in part on $N=\log_2(1+K1+K2)$, wherein N is the maximum number of bits, K1 is a number of high priority SR resources among the one or more SR resources, and K2 is a number of low priority SR resources among the one or more SR resources.

In a fifty-first aspect, alone or in combination with one or more of the first through fiftieth aspects, performing the action associated with at least one of the one or more HARQ ACK resources or the one or more SR resources includes transmitting, using a low priority resource among the one or more HARQ ACK resources or the one or more SR resources, a payload of at least one of the one or more HARQ ACK resources or the one or more SR resources, wherein the low priority resource is transmitted using a power control parameter associated with a high priority resource among the one or more HARQ ACK resources or the one or more SR resources.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
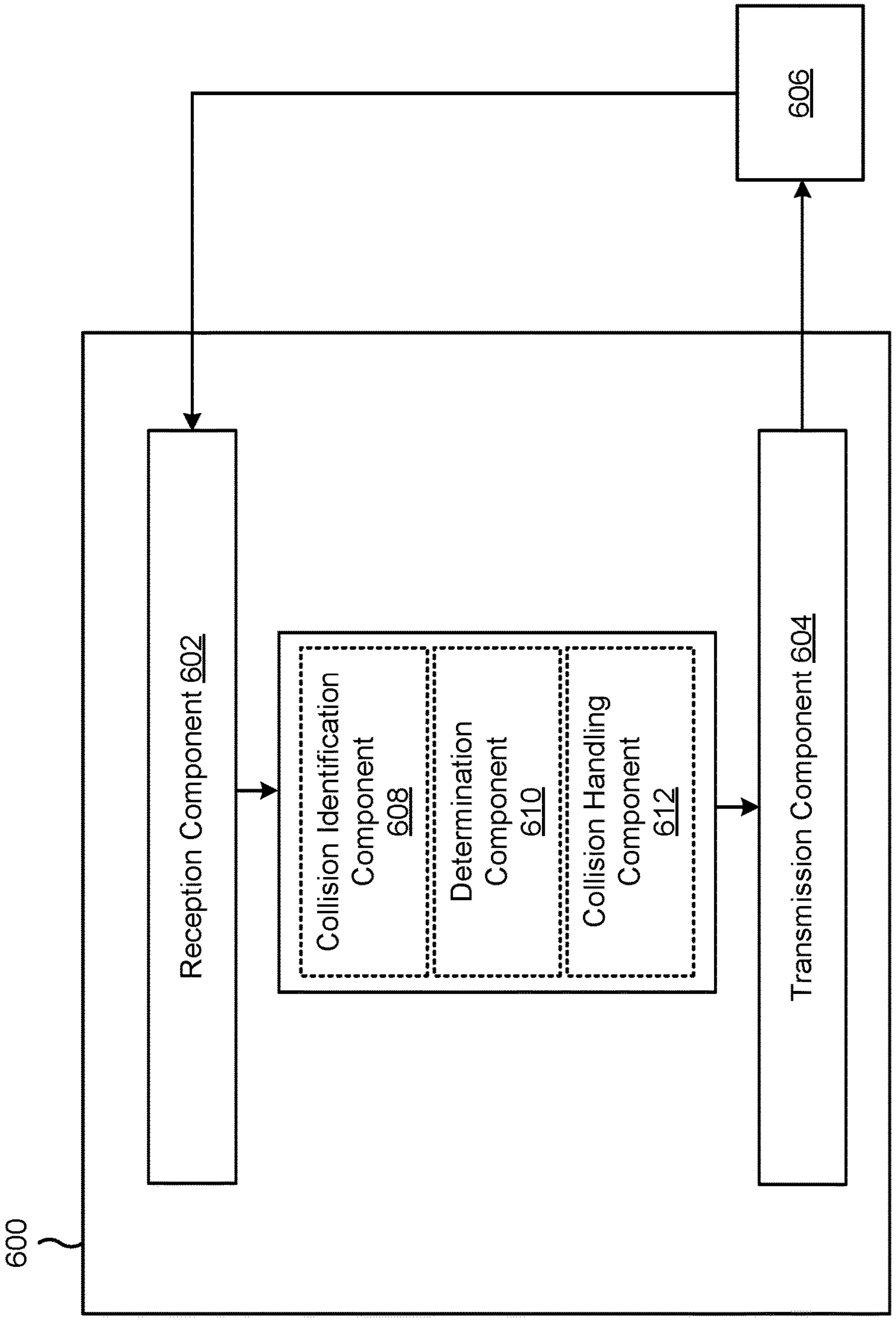
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a collision identification component 608, a determination component 610, or a collision handling component 612, among other examples.

In some aspects, the apparatus 600 may be configured to perform one or more operations described herein in connection with FIGS. 3 and/or 4. Additionally or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The collision identification component 608 may identify a collision between one or more HARQ ACK resources and one or more SR resources, where at least one of the one or more HARQ ACK resources and at least one of the one or more SR resources have different priorities. In some aspects, the collision identification component 608 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 610 may determine an action to be performed, the action associated with at least one of the one or more HARQ ACK resources or the one or more SR resources based at least in part on at least one of a PUCCH format or a priority associated with at least one of the one or more HARQ ACK resources, or a PUCCH format or a priority associated with at least one of the one or more SR resources. In some aspects, the determination component 610 may include a receive processor, a transmit MIMO processor, a transmit processor, a controller/processor, a memory, or a combination thereof, of the UE described above in connection with FIG. 2.

The collision handling component 612 may perform the action associated with at least one of the one or more HARQ ACK resources or the one or more SR resources. In some aspects, the collision handling component 612 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The collision identification component 608 may identify a collision between a HARQ ACK resource, associated with a first priority and a PUCCH format, and an SR resource associated with a second priority and the PUCCH format. The determination component 610 may determine the action based at least in part on at least one of: whether the first priority is a higher priority than the second priority, the PUCCH format, or whether a payload of the SR resource indicates a positive SR.

The collision identification component 608 may identify a collision between a HARQ ACK resource associated with a low priority and associated with a PUCCH format 0, and an SR resource associated with a high priority and associated with a PUCCH format 0. The determination component 610 may determine to multiplex a payload of the HARQ ACK resource and a payload of the SR resource on the HARQ ACK resource. The determination component 610 may determine that a power control parameter associated with transmitting a multiplexed HARQ ACK and SR resource on the HARQ ACK resource is to be based at least in part on the SR resource. The determination component 610 may determine a power boost value to apply to a transmission carrying a multiplexed payload that includes the payload of the HARQ ACK resource and the payload of the SR resource.

The collision handling component 612 may multiplex a payload of the HARQ ACK resource and a payload of the SR resource on the HARQ ACK resource. The determination component 610 may determine a power control parameter based at least in part on the SR resource. The transmission component 604 may transmit, using the HARQ ACK resource and the power control parameter, a multiplexed payload that includes the payload of the HARQ ACK resource and the payload of the SR resource. The determination component 610 may determine a power boost value to apply to a transmission carrying the multiplexed payload. The transmission component 604 may transmit, using the HARQ ACK resource, the power control parameter, and the power boost value, the multiplexed payload.

The determination component 610 may determine to multiplex a payload of the HARQ ACK resource and a payload of the SR resource on the SR resource. The collision handling component 612 may multiplex a payload of the HARQ ACK resource and a payload of the SR resource on the SR resource. The transmission component 604 may transmit, using the SR resource, a multiplexed payload that includes the payload of the HARQ ACK resource and the payload of the SR resource.

The collision identification component 608 may identify a collision between a HARQ ACK resource associated with a low priority and associated with a PUCCH format 0, and an SR resource associated with a high priority and associated with a PUCCH format 1. The determination component 610 may determine that a payload of the SR resource indicates a positive SR. The determination component 610 may determine to transmit a payload of the HARQ ACK resource on the SR resource based at least in part on determining that the payload of the SR resource indicates a positive SR. The transmission component 604 may transmit, using the SR resource, a payload of the HARQ ACK resource.

The collision identification component 608 may identify a collision between a HARQ ACK resource associated with a low priority and associated with a PUCCH format 1, and an SR resource associated with a high priority and associated with a PUCCH format 0. The determination component 610 may determine whether a payload of the SR resource indicates a positive SR. The determination component 610 may determine whether to transmit a payload of the HARQ ACK resource on the HARQ ACK resource or the SR resource based at least in part on determining whether the payload of the SR resource indicates a positive SR. The transmission component 604 may transmit, using the SR resource, a payload of the HARQ ACK resource based at least in part on the payload of the SR resource indicating a positive SR. The transmission component 604 may transmit, using the HARQ ACK resource, a payload of the HARQ ACK resource based at least in part on the payload of the SR resource indicating a negative SR.

The collision handling component 612 may drop the SR resource based at least in part on a payload of the SR resource indicating a negative SR. The transmission component 604 may transmit, using the HARQ ACK resource, a payload of the HARQ ACK resource. The collision handling component 612 may drop the SR resource. The transmission component 604 may transmit, using the HARQ ACK resource, a payload of the HARQ ACK resource.

The collision identification component 608 may identify a collision between a HARQ ACK resource associated with a high priority and associated with a PUCCH format 0, and an SR resource associated with a low priority and associated with a PUCCH format 0. The determination component 610 may determine to multiplex a payload of the HARQ ACK resource and a payload of the SR resource on the HARQ ACK resource.

The determination component 610 may determine a power boost value to apply to a transmission of a multiplexed payload that includes the payload of the HARQ ACK resource and the payload of the SR resource. The collision handling component 612 may multiplex a payload of the HARQ ACK resource and a payload of the SR resource on the HARQ ACK resource. The transmission component 604 may transmit, using the HARQ ACK resource and applying a power boost value, a multiplexed payload that includes the payload of the HARQ ACK resource and the payload of the SR resource.

The collision identification component 608 may identify a collision between a HARQ ACK resource associated with a high priority and associated with a PUCCH format 0, and an SR resource associated with a low priority and associated with a PUCCH format 1. The determination component 610 may determine to multiplex a payload of the HARQ ACK resource and a payload of the SR resource on the HARQ ACK resource. The determination component 610 may determine a power boost value to apply to a transmission of a multiplexed payload that includes the payload of the HARQ ACK resource and the payload of the SR resource. The determination component 610 may determine to drop the SR resource.

The collision handling component 612 may multiplex a payload of the HARQ ACK resource and a payload of the SR resource on the HARQ ACK resource. The transmission component 604 may transmit, using the HARQ ACK resource and applying a power boost value, a multiplexed payload that includes the payload of the HARQ ACK resource and the payload of the SR resource. The collision handling component 612 may drop the SR resource. The transmission component 604 may transmit, using the HARQ ACK resource, a payload of the HARQ ACK resource.

The collision identification component 608 may identify a collision between a HARQ ACK resource, associated with a high priority and associated with a PUCCH format 1, and an SR resource associated with a low priority and associated with a PUCCH format 1. The determination component 610 may determine whether a payload of the SR resource indicates a positive SR. The determination component 610 may determine whether to transmit a payload of the HARQ ACK resource using the SR resource or the HARQ ACK resource based at least in part on whether the payload of the SR resource indicates a positive SR. The determination component 610 may determine a power control parameter based at least in part on the HARQ ACK resource. The transmission component 604 may transmit, using the SR resource and the power control parameter, a payload of the HARQ ACK resource based at least in part on a payload of the SR resource indicating a positive SR.

The collision identification component 608 may identify a collision between a first HARQ ACK resource associated with a low priority, a second HARQ ACK resource associated with a high priority, and an SR resource associated with the high priority. The determination component 610 may determine to multiplex, on the second HARQ ACK resource, a payload of the first HARQ ACK resource and a payload of the second HARQ ACK resource. The determination component 610 may determine that the second HARQ ACK resource that includes a multiplexed payload is associated with the high priority. The determination component 610 may determine an action to be performed associated with the second HARQ ACK resource, that includes a multiplexed payload, and the SR resource based at least in part on determining that the second HARQ ACK resource that includes the multiplexed payload is associated with the high priority.

The collision handling component 612 may multiplex a payload of the first HARQ ACK resource and a payload of the second HARQ ACK resource on the second HARQ ACK resource. The collision handling component 612 may perform an action associated with at least one of the second HARQ ACK resource or the SR resource based at least in part on a PUCCH format associated with the second HARQ ACK resource and a PUCCH format associated with the SR resource.

The collision identification component 608 may identify a collision between a first HARQ ACK resource associated with a low priority, a second HARQ ACK resource associated with a high priority, and an SR resource associated with the low priority. The determination component 610 may determine to multiplex, on the second HARQ ACK resource, a payload of the first HARQ ACK resource and a payload of the second HARQ ACK resource. The determination component 610 may determine that the second HARQ ACK resource that includes a multiplexed payload is associated with the high priority. The determination component 610 may determine an action to be performed associated with the second HARQ ACK resource, that includes a multiplexed payload, and the SR resource based at least in part on determining that the second HARQ ACK resource that includes the multiplexed payload is associated with the high priority.

The collision handling component 612 may multiplex a payload of the first HARQ ACK resource and a payload of the second HARQ ACK resource on the second HARQ ACK resource. The collision handling component 612 may perform an action associated with at least one of the second HARQ ACK resource or the SR resource based at least in part on a PUCCH format associated with the second HARQ ACK resource and a PUCCH format associated with the SR resource.

The collision identification component 608 may identify a collision between a HARQ ACK resource, associated with a PUCCH format 0 or associated with a PUCCH format 1, a first SR resource associated with a high priority, and a second SR resource associated with a low priority. The determination component 610 may determine whether a payload of the first SR resource indicates a positive SR or a negative SR. The determination component 610 may determine an action to be performed associated with a payload of the HARQ ACK resource and the payload of the first SR resource, or with the payload of the HARQ ACK resource and a payload of the second SR resource, based at least in part on determining whether the payload of the first SR resource indicates a positive SR or a negative SR. The determination component 610 may determine to drop the second SR resource. The determination component 610 may determine an action to be performed associated with at least one of the HARQ ACK resource and the first SR resource based at least in part on a PUCCH format associated with the first SR resource.

The collision handling component 612 may perform an action associated with a payload of the HARQ ACK resource and a payload of the second SR resource based at least in part on a payload of the first SR resource indicating a negative SR. The collision handling component 612 may perform an action associated with the payload of the HARQ ACK resource and the payload of the first SR resource based at least in part on the payload of the first SR resource indicating a positive SR. The collision handling component 612 may drop the second SR resource. The collision handling component 612 may perform an action associated with a payload of the HARQ ACK resource and a payload of the first SR resource.

The collision identification component 608 may identify a collision between a HARQ ACK resource, where the HARQ ACK resource is associated with a PUCCH format 2, associated with a PUCCH format 3, or associated with a PUCCH format 4, and at least one of: one or more SR resources associated with a high priority, or one or more SR resources associated with a low priority. The determination component 610 may determine whether a payload of an SR resource, of the one or more SR resources associated with a high priority, indicates a positive SR. The determination component 610 may determine to append information to a payload of the HARQ ACK resource to indicate a payload of the one or more SR resources associated with the high priority or the one or more SR resources associated with the low priority based at least in part on determining whether a payload of an SR resource, of the one or more SR resources associated with the high priority, indicates a positive SR. The determination component 610 may determine a size of the information based at least in part on a quantity of resources included in the one or more SR resources associated with the high priority and the one or more SR resources associated with the low priority.

The collision handling component 612 may append information, indicating a payload of any positive SRs included in the one or more SR resources associated with the high priority, to a payload of the HARQ ACK resource based at least in part on at least one payload of the one or more SR resources associated with the high priority indicating a positive SR. The collision handling component 612 may append information, indicating a payload of any positive SRs included in the one or more SR resources associated with the low priority, to a payload of the HARQ ACK resource based at least in part on no payloads of the one or more SR resources associated with the high priority indicating a positive SR. The transmission component 604 may transmit, using the HARQ ACK resource, the payload of the HARQ ACK resource appended with the information indicating a payload of any positive SRs included in the one or more SR resources associated with the high priority, or the information indicating a payload of any positive SRs included in the one or more SR resources associated with the low priority. In some aspects, a maximum number of bits of the information is based at least in part on $N=\log_2(1+K1+K2)$, wherein N is the maximum number of bits, K1 is a number of high priority SR resources among the one or more SR resources, and K2 is a number of low priority SR resources among the one or more SR resources.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: identifying a collision between one or more hybrid automatic repeat request (HARQ) acknowledgment (ACK) resources and one or more scheduling request (SR) resources, wherein at least one of the one or more HARQ ACK resources and at least one of the one or more SR resources have different priorities; and performing an action, to resolve the collision, associated with at least one of the one or more HARQ ACK resources or the one or more SR resources, wherein the action is based at least in part on at least one of: a physical uplink control channel (PUCCH) format or a priority associated with at least one of the one or more HARQ ACK resources, or a PUCCH format or a priority associated with at least one of the one or more SR resources.

Aspect 2: The method of Aspect 1, wherein identifying the collision between the one or more HARQ ACK resources and the one or more SR resources comprises: identifying a collision between a HARQ ACK resource, associated with a first priority and a first PUCCH format, and an SR resource associated with a second priority and a second PUCCH format; and wherein the action to be performed associated with at least one of the one or more HARQ ACK resources or the one or more SR resources is based at least in part on at least one of: whether the first priority is a higher priority than the second priority, the first PUCCH format or the second PUCCH format, or whether a payload of the SR resource indicates a positive SR.

Aspect 3: The method of Aspect 1, wherein identifying the collision between the one or more HARQ ACK resources and the one or more SR resources comprises: identifying a collision between a HARQ ACK resource associated with a low priority and associated with a PUCCH format 0, and an SR resource associated with a high priority and associated with a PUCCH format 0.

Aspect 4: The method of Aspect 3, wherein the action to be performed associated with at least one of the one or more HARQ ACK resources or the one or more SR resources includes multiplexing a payload of the HARQ ACK resource and a payload of the SR resource on the HARQ ACK resource; and wherein the action to be performed includes transmitting a multiplexed HARQ ACK and SR resource on the HARQ ACK resource using a power control parameter that is based at least in part on the SR resource.

Aspect 5: The method of Aspect 4, wherein the power control parameter includes at least one of an open-loop power control parameter or a closed-loop power control parameter.

Aspect 6: The method of any of Aspects 4-5, wherein the action to be performed associated with at least one of the one or more HARQ ACK resources or the one or more SR resources comprises: transmitting a multiplexed payload that includes the payload of the HARQ ACK resource and the payload of the SR resource using a power boost value.

Aspect 7: The method of any of Aspects 3-6, wherein performing the action associated with at least one of the one or more HARQ ACK resources or the one or more SR resources comprises: multiplexing a payload of the HARQ ACK resource and a payload of the SR resource on the HARQ ACK resource; and transmitting, using the HARQ ACK resource and a power control parameter that is based at least in part on the SR resource, a multiplexed payload that includes the payload of the HARQ ACK resource and the payload of the SR resource.

Aspect 8: The method of Aspect 7, wherein performing the action associated with at least one of the one or more HARQ ACK resources or the one or more SR resources comprises: transmitting, using the HARQ ACK resource, the power control parameter, and a power boost value, the multiplexed payload.

Aspect 9: The method of any of Aspects 3-8, wherein the action to be performed associated with at least one of the one or more HARQ ACK resources or the one or more SR resources includes multiplexing a payload of the HARQ ACK resource and a payload of the SR resource on the SR resource.

Aspect 10: The method of any of Aspects 3-9, wherein performing the action associated with at least one of the one or more HARQ ACK resources or the one or more SR resources comprises: multiplexing a payload of the HARQ ACK resource and a payload of the SR resource on the SR resource; and transmitting, using the SR resource, a multiplexed payload that includes the payload of the HARQ ACK resource and the payload of the SR resource.

Aspect 11: The method of Aspect 1, wherein identifying the collision between the one or more HARQ ACK resources and the one or more SR resources comprises: identifying a collision between a HARQ ACK resource associated with a low priority and associated with a PUCCH format 0, and an SR resource associated with a high priority and associated with a PUCCH format 1.

Aspect 12: The method of Aspect 11, wherein the action to be performed associated with at least one of the one or more HARQ ACK resources or the one or more SR resources includes transmitting a payload of the HARQ ACK resource on the SR resource based at least in part on a payload of the SR resource indicating a positive SR.

Aspect 13: The method of any of Aspects 11-12, wherein performing the action associated with at least one of the one or more HARQ ACK resources or the one or more SR resources comprises: transmitting, using the SR resource, a payload of the HARQ ACK resource.

Aspect 14: The method of Aspect 1, wherein identifying the collision between the one or more HARQ ACK resources and the one or more SR resources comprises: identifying a collision between a HARQ ACK resource associated with a low priority and associated with a PUCCH format 1, and an SR resource associated with a high priority and associated with a PUCCH format 0.

Aspect 15: The method of Aspect 14, wherein the action to be performed associated with at least one of the one or more HARQ ACK resources or the one or more SR resources includes transmitting a payload of the HARQ ACK resource on the HARQ ACK resource or the SR resource based at least in part on whether a payload of the SR resource indicates a positive SR.

Aspect 16: The method of any of Aspects 14-15, wherein performing the action associated with at least one of the one or more HARQ ACK resources or the one or more SR resources comprises: transmitting, using the SR resource, a payload of the HARQ ACK resource based at least in part on the payload of the SR resource indicating a positive SR; or transmitting, using the HARQ ACK resource, a payload of the HARQ ACK resource based at least in part on the payload of the SR resource indicating a negative SR.

Aspect 17: The method of any of Aspects 14-16, wherein performing the action associated with at least one of the one or more HARQ ACK resources or the one or more SR resources comprises: dropping the SR resource; and transmitting, using the HARQ ACK resource, a payload of the HARQ ACK resource.

Aspect 18: The method of any of Aspects 14-17, wherein performing the action associated with at least one of the one or more HARQ ACK resources or the one or more SR resources comprises: dropping the SR resource; and transmitting, using the HARQ ACK resource, a payload of the HARQ ACK resource.

Aspect 19: The method of Aspect 1, wherein identifying the collision between the one or more HARQ ACK resources and the one or more SR resources comprises: identifying a collision between a HARQ ACK resource associated with a high priority and associated with a PUCCH format 0, and an SR resource associated with a low priority and associated with a PUCCH format 0.

Aspect 20: The method of Aspect 19, wherein the action to be performed associated with at least one of the one or more HARQ ACK resources or the one or more SR resources includes multiplexing a payload of the HARQ ACK resource and a payload of the SR resource on the HARQ ACK resource.

Aspect 21: The method of any of Aspects 19-20, wherein the action to be performed associated with at least one of the one or more HARQ ACK resources or the one or more SR resources includes transmitting a multiplexed payload that includes the payload of the HARQ ACK resource and the payload of the SR resource using a power boost value.

Aspect 22: The method of any of Aspects 19-21, wherein performing the action associated with at least one of the one or more HARQ ACK resources or the one or more SR resources comprises: multiplexing a payload of the HARQ ACK resource and a payload of the SR resource on the HARQ ACK resource; and transmitting, using the HARQ ACK resource and applying a power boost value, a multiplexed payload that includes the payload of the HARQ ACK resource and the payload of the SR resource.

Aspect 23: The method of Aspect 1, wherein identifying the collision between the one or more HARQ ACK resources and the one or more SR resources comprises: identifying a collision between a HARQ ACK resource associated with a high priority and associated with a PUCCH format 0, and an SR resource associated with a low priority and associated with a PUCCH format 1.

Aspect 24: The method of Aspect 23, wherein the action to be performed associated with at least one of the one or more HARQ ACK resources or the one or more SR resources includes multiplexing a payload of the HARQ ACK resource and a payload of the SR resource on the HARQ ACK resource.

Aspect 25: The method of any of Aspects 23-24, wherein the action to be performed associated with at least one of the one or more HARQ ACK resources or the one or more SR resources includes transmitting a multiplexed payload that includes the payload of the HARQ ACK resource and the payload of the SR resource using power boost value.

Aspect 26: The method of any of Aspects 23-25, wherein the action to be performed associated with at least one of the one or more HARQ ACK resources or the one or more SR resources includes dropping the SR resource.

Aspect 27: The method of any of Aspects 23-26, wherein performing the action associated with at least one of the one or more HARQ ACK resources or the one or more SR resources comprises: multiplexing a payload of the HARQ ACK resource and a payload of the SR resource on the HARQ ACK resource; and transmitting, using the HARQ ACK resource and applying a power boost value, a multiplexed payload that includes the payload of the HARQ ACK resource and the payload of the SR resource.

Aspect 28: The method of any of Aspects 23-27, wherein performing the action associated with at least one of the one or more HARQ ACK resources or the one or more SR resources comprises: dropping the SR resource; and transmitting, using the HARQ ACK resource, a payload of the HARQ ACK resource.

Aspect 29: The method of Aspect 1, wherein identifying the collision between the one or more HARQ ACK resources and the one or more SR resources comprises: identifying a collision between a HARQ ACK resource, associated with a high priority and associated with a PUCCH format 1, and an SR resource associated with a low priority and associated with a PUCCH format 1.

Aspect 30: The method of Aspect 29, wherein the action to be performed associated with at least one of the one or more HARQ ACK resources or the one or more SR resources includes transmitting a payload of the HARQ ACK resource using the SR resource or the HARQ ACK resource based at least in part on whether a payload of the SR resource indicates a positive SR.

Aspect 31: The method of Aspect 30, wherein transmitting the payload of the HARQ ACK resource using the SR resource or the HARQ ACK resource comprises: transmitting, using the SR resource, the payload of the HARQ ACK resource based at least in part on the payload of the SR resource indicating the positive SR; or transmitting, using the HARQ ACK resources, the payload of the HARQ ACK resource based at least in part on the payload of the SR resource indicating a negative SR.

Aspect 32: The method of any of Aspects 29-31, wherein performing the action associated with at least one of the one or more HARQ ACK resources or the one or more SR resources comprises: transmitting, using the SR resource and a power control parameter that is based at least in part on the HARQ ACK resource, a payload of the HARQ ACK resource based at least in part on a payload of the SR resource indicating a positive SR.

Aspect 33: The method of Aspect 32, wherein the power control parameter includes at least one of an open-loop power control parameter or a closed-loop power control parameter.

Aspect 34: The method of any of Aspects 1-33, wherein identifying the collision between the one or more HARQ ACK resources and the one or more SR resources comprises: identifying a collision between: a first HARQ ACK resource associated with a low priority, a second HARQ ACK resource associated with a high priority, and an SR resource associated with the high priority.

Aspect 35: The method of Aspect 34, wherein the action to be performed associated with at least one of the one or more HARQ ACK resources or the one or more SR resources comprises: multiplexing, on the second HARQ ACK resource, a payload of the first HARQ ACK resource and a payload of the second HARQ ACK resource; and performing another action associated with the second HARQ ACK resource, that includes a multiplexed payload, and the SR resource based at least in part on associating the multiplexed payload with the high priority.

Aspect 36: The method of any of Aspects 34-35, wherein performing the action associated with at least one of the one or more HARQ ACK resources or the one or more SR resources comprises: multiplexing a payload of the first HARQ ACK resource and a payload of the second HARQ ACK resource on the second HARQ ACK resource; and performing another action associated with at least one of the second HARQ ACK resource or the SR resource based at least in part on a PUCCH format associated with the second HARQ ACK resource and a PUCCH format associated with the SR resource.

Aspect 37: The method of any of Aspects 1-36, wherein identifying the collision between the one or more HARQ ACK resources and the one or more SR resources comprises: identifying a collision between: a first HARQ ACK resource associated with a low priority, a second HARQ ACK resource associated with a high priority, and an SR resource associated with the low priority.

Aspect 38: The method of Aspect 37, wherein the action to be performed associated with at least one of the one or more HARQ ACK resources or the one or more SR resources comprises: multiplexing, on the second HARQ ACK resource, a payload of the first HARQ ACK resource and a payload of the second HARQ ACK resource; and performing another action associated with the second HARQ ACK resource, that includes a multiplexed payload, and the SR resource based at least in part on associating the multiplexed payload with the high priority.

Aspect 39: The method of any of Aspects 37-38, wherein performing the action associated with at least one of the one or more HARQ ACK resources or the one or more SR resources comprises: multiplexing a payload of the first HARQ ACK resource and a payload of the second HARQ ACK resource on the second HARQ ACK resource; and performing another action associated with at least one of the second HARQ ACK resource or the SR resource based at least in part on a PUCCH format associated with the second HARQ ACK resource and a PUCCH format associated with the SR resource.

Aspect 40: The method of any of Aspects 1-39, wherein identifying the collision between the one or more HARQ ACK resources and the one or more SR resources comprises: identifying a collision between: a HARQ ACK resource, associated with a PUCCH format 0 or associated with a PUCCH format 1, a first SR resource associated with a high priority, and a second SR resource associated with a low priority.

Aspect 41: The method of Aspect 40, wherein the action to be performed associated with at least one of the one or more HARQ ACK resources or the one or more SR resources comprises: performing the action associated with a payload of the HARQ ACK resource and the payload of the first SR resource, or with the payload of the HARQ ACK resource and a payload of the second SR resource, based at least in part on whether a payload of the first SR resource indicates a positive SR or a negative SR.

Aspect 42: The method of any of Aspects 40-41, wherein the action to be performed associated with at least one of the one or more HARQ ACK resources or the one or more SR resources comprises: dropping the second SR resource; and performing another action associated with at least one of the HARQ ACK resource and the first SR resource, wherein the other action is based at least in part on a PUCCH format associated with the first SR resource.

Aspect 43: The method of any of Aspects 40-42, wherein performing the action associated with at least one of the one or more HARQ ACK resources or the one or more SR resources comprises: performing a first action associated with a payload of the HARQ ACK resource and a payload of the second SR resource based at least in part on a payload of the first SR resource indicating a negative SR; or performing a second action associated with the payload of the HARQ ACK resource and the payload of the first SR resource based at least in part on the payload of the first SR resource indicating a positive SR.

Aspect 44: The method of any of Aspects 40-43, wherein performing the action associated with at least one of the one or more HARQ ACK resources or the one or more SR resources comprises: dropping the second SR resource; and performing another action associated with a payload of the HARQ ACK resource and a payload of the first SR resource.

Aspect 45: The method of any of Aspects 1-44, wherein identifying the collision between the one or more HARQ ACK resources and the one or more SR resources comprises: identifying a collision between: a HARQ ACK resource, wherein the HARQ ACK resource is associated with a PUCCH format 2, associated with a PUCCH format 3, or associated with a PUCCH format 4, and at least one of: one or more SR resources associated with a high priority, or one or more SR resources associated with a low priority.

Aspect 46: The method of Aspect 45, wherein the action to be performed associated with at least one of the one or more HARQ ACK resources or the one or more SR resources comprises: appending information to a payload of the HARQ ACK resource to indicate a payload of the one or more SR resources associated with the high priority or the one or more SR resources associated with the low priority based at least in part on whether a payload of an SR resource, of the one or more SR resources associated with the high priority, indicates a positive SR.

Aspect 47: The method of Aspect 46, further comprising: determining a size of the information based at least in part on a quantity of resources included in the one or more SR resources associated with the high priority and the one or more SR resources associated with the low priority.

Aspect 48: The method of any of Aspects 45-47, wherein performing the action associated with at least one of the one or more HARQ ACK resources or the one or more SR resources comprises: appending information, indicating a payload of any positive SRs included in the one or more SR resources associated with the high priority, to a payload of the HARQ ACK resource based at least in part on at least one payload of the one or more SR resources associated with the high priority indicating a positive SR; or appending information, indicating a payload of any positive SRs included in the one or more SR resources associated with the low priority, to a payload of the HARQ ACK resource based at least in part on no payloads of the one or more SR resources associated with the high priority indicating a positive SR.

Aspect 49: The method of Aspect 48, wherein performing the action associated with at least one of the one or more HARQ ACK resources or the one or more SR resources comprises: transmitting, using the HARQ ACK resource, the payload of the HARQ ACK resource appended with the information indicating a payload of any positive SRs included in the one or more SR resources associated with the high priority, or the information indicating a payload of any positive SRs included in the one or more SR resources associated with the low priority.

Aspect 50: The method of any of Aspects 1-49, wherein performing the action associated with at least one of the one or more HARQ ACK resources or the one or more SR resources comprises: multiplexing a first payload of one or more HARQ ACK resources and a second payload of the one or more SR resources on the one or more HARQ ACK resources or the one or more SR resources; and transmitting, using the one or more HARQ ACK resources or the one or more SR resources, a message including a multiplexed payload, wherein the multiplexed payload includes the first payload and the second payload.

Aspect 51: The method of any of Aspects 1-50, wherein the collision is between a HARQ ACK resource associated with a low priority and associated with a PUCCH format 0, and an SR resource associated with a high priority and associated with a PUCCH format 1; and wherein the action to be performed associated with at least one of the one or more HARQ ACK resources or the one or more SR resources includes: transmitting a payload of the HARQ ACK resource on the HARQ ACK resource based at least in part on a payload of the SR resource indicating a negative SR; and dropping the SR resource based at least in part on the payload of the SR resource indicating the negative SR.

Aspect 52: The method of any of Aspects 1-51, wherein the collision is between a HARQ ACK resource, associated with a PUCCH format 0 or associated with a PUCCH format 1, a first SR resource associated with a high priority, and a second SR resource associated with a low priority; and wherein performing the action associated with at least one of the one or more HARQ ACK resources or the one or more SR resources comprises: dropping the second SR resource based at least in part on a payload of the first SR resource indicating a positive SR.

Aspect 53: The method of any of Aspects 1-52, wherein performing the action associated with at least one of the one or more HARQ ACK resources or the one or more SR resources comprises: appending information, associated with at least one SR resource of the one or more SR resources, to a payload of the HARQ ACK resource, wherein a maximum number of bits of the information is based at least in part on $N=\log_2(1+K1+K2)$, wherein N is the maximum number of bits, K1 is a number of high priority SR resources among the one or more SR resources, and K2 is a number of low priority SR resources among the one or more SR resources.

Aspect 54: The method of any of Aspects 1-53, wherein performing the action associated with at least one of the one or more HARQ ACK resources or the one or more SR resources comprises: transmitting, using a low priority resource among the one or more HARQ ACK resources or the one or more SR resources, a payload of at least one of the one or more HARQ ACK resources or the one or more SR resources, wherein the low priority resource is transmitted using a power control parameter associated with a high priority resource among the one or more HARQ ACK resources or the one or more SR resources.

Aspect 55: An apparatus for wireless communication at a device, comprising a processor; memory coupled with the processor; and instructions stored in the memory and executable by the processor to cause the apparatus to perform the method of one or more of Aspects 1-54.

Aspect 56: A device for wireless communication, comprising a memory and one or more processors coupled to the memory, the one or more processors configured to perform the method of one or more of Aspects 1-54.

Aspect 57: An apparatus for wireless communication, comprising at least one means for performing the method of one or more of Aspects 1-54.

Aspect 58: A non-transitory computer-readable medium storing code for wireless communication, the code comprising instructions executable by a processor to perform the method of one or more of Aspects 1-54.

Aspect 59: A non-transitory computer-readable medium storing a set of instructions for wireless communication, the set of instructions comprising one or more instructions that, when executed by one or more processors of a device, cause the device to perform the method of one or more of Aspects 1-54.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

identifying a collision between one or more hybrid automatic repeat request (HARQ) acknowledgment (ACK) resources and one or more scheduling request (SR) resources, wherein at least one of the one or more HARQ ACK resources and at least one of the one or more SR resources have different priorities; and performing an action, to resolve the collision, associated with at least one of the one or more HARQ ACK resources or the one or more SR resources, wherein the action is selected based at least in part on:

a first physical uplink control channel (PUCCH) format, a priority associated with at least one of the one or more HARQ ACK resources and a quantity of bits of the one or more HARQ ACK resources, and a second PUCCH format, a priority associated with at least one of the one or more SR resources, whether the SR is positive or negative, and a quantity of bits associated with the one or more SR resources.

2. The method of claim 1, wherein identifying the collision between the one or more HARQ ACK resources and the one or more SR resources comprises:

identifying a collision between a HARQ ACK resource, associated with a first priority and the first PUCCH format, and an SR resource associated with a second priority and the second PUCCH format; and wherein the action to be performed associated with at least one of the one or more HARQ ACK resources or the one or more SR resources is based at least in part on at least one of:

whether the first priority is a higher priority than the second priority, the first PUCCH format or the second PUCCH format, or whether a payload of the SR resource indicates a positive SR.

3. The method of claim 1, wherein the collision is between a HARQ ACK resource associated with a low priority and associated with the first PUCCH format, and an SR resource associated with a high priority and associated with the second PUCCH format, wherein the first PUCCH format is the same as the second PUCCH format; and wherein performing the action associated with at least one of the one or more HARQ ACK resources or the one or more SR resources comprises:

multiplexing a payload of the HARQ ACK resource and a payload of the SR resource on the HARQ ACK resource; and transmitting, using the HARQ ACK resource, a multiplexed payload that includes the payload of the HARQ ACK resource and the payload of the SR resource.

4. The method of claim 1, wherein the collision is between a HARQ ACK resource associated with a low priority and associated with the first PUCCH format, and an SR resource associated with a high priority and associated with the second PUCCH format, wherein the first PUCCH format is the same as the second PUCCH format; and wherein performing the action associated with at least one of the one or more HARQ ACK resources or the one or more SR resources comprises:

multiplexing a payload of the HARQ ACK resource and a payload of the SR resource on the SR resource; and transmitting, using the SR resource, a multiplexed payload that includes the payload of the HARQ ACK resource and the payload of the SR resource.

5. The method of claim 1, wherein the collision is between a HARQ ACK resource associated with a low priority and associated with the first PUCCH format, and an SR resource associated with a high priority and associated with the second PUCCH format, wherein the first PUCCH format is different from the second PUCCH format; and wherein the action to be performed associated with at least one of the one or more HARQ ACK resources or the one or more SR resources includes transmitting a payload of the HARQ ACK resource on the SR resource based at least in part on a payload of the SR resource indicating a positive SR.

6. The method of claim 1, wherein the collision is between a HARQ ACK resource associated with a low priority and associated with the first PUCCH format, and an SR resource associated with a high priority and associated with the second PUCCH format, wherein the first PUCCH format is different from the second PUCCH format; and wherein the action to be performed associated with at least one of the one or more HARQ ACK resources or the one or more SR resources includes:

transmitting a payload of the HARQ ACK resource on the HARQ ACK resource based at least in part on a payload of the SR resource indicating a negative SR; and dropping the SR resource based at least in part on the payload of the SR resource indicating the negative SR.

7. The method of claim 1, wherein the collision is between a HARQ ACK resource associated with a low priority and associated with the first PUCCH format, and an SR resource associated with a high priority and associated with the second PUCCH format, wherein the first PUCCH format is different from the second PUCCH format; and wherein the action to be performed associated with at least one of the one or more HARQ ACK resources or the one or more SR resources includes transmitting a payload of the HARQ ACK resource on the HARQ ACK resource or the SR resource based at least in part on whether a payload of the SR resource indicates a positive SR.

8. The method of claim 1, wherein the collision is between a HARQ ACK resource associated with a low priority and associated with the first PUCCH format, and an SR resource associated with a high priority and associated with the second PUCCH format, wherein the first PUCCH format is different from the second PUCCH format; and wherein performing the action associated with at least one of the one or more HARQ ACK resources or the one or more SR resources comprises:

transmitting, using the SR resource, a payload of the HARQ ACK resource based at least in part on the payload of the SR resource indicating a positive SR; or transmitting, using the HARQ ACK resource, a payload of the HARQ ACK resource based at least in part on the payload of the SR resource indicating a negative SR.

9. The method of claim 1, wherein the collision is between a HARQ ACK resource associated with a low priority and associated with the first PUCCH format, and an SR resource associated with a high priority and associated with the second PUCCH format, wherein the first PUCCH format is different from the second PUCCH format; and wherein performing the action associated with at least one of the one or more HARQ ACK resources or the one or more SR resources comprises:

dropping the SR resource; and transmitting, using the HARQ ACK resource, a payload of the HARQ ACK resource.

10. The method of claim 1, wherein the collision is between a HARQ ACK resource associated with a high priority and associated with the first PUCCH format, and an SR resource associated with a low priority and associated with the second PUCCH format, wherein the first PUCCH format is the same as the second PUCCH format; and wherein the action to be performed associated with at least one of the one or more HARQ ACK resources or the one or more SR resources includes multiplexing a payload of the HARQ ACK resource and a payload of the SR resource on the HARQ ACK resource.

11. The method of claim 1, wherein the collision is between a HARQ ACK resource associated with a high priority and associated with the first PUCCH format, and an SR resource associated with a low priority and associated with the second PUCCH format, wherein the first PUCCH format is different from the second PUCCH format; and wherein the action to be performed associated with at least one of the one or more HARQ ACK resources or the one or more SR resources includes multiplexing a payload of the HARQ ACK resource and a payload of the SR resource on the HARQ ACK resource.

12. The method of claim 1, wherein the collision is between a HARQ ACK resource associated with a high priority and associated with the first PUCCH format, and an SR resource associated with a low priority and associated with the second PUCCH format, wherein the first PUCCH format is different from the second PUCCH format; and wherein the action to be performed associated with at least one of the one or more HARQ ACK resources or the one or more SR resources includes dropping the SR resource.

13. The method of claim 1, wherein the collision is between a HARQ ACK resource associated with a high priority and associated with the first PUCCH format, and an SR resource associated with a low priority and associated with the second PUCCH format, wherein the first PUCCH format is different from the second PUCCH format; and wherein performing the action associated with at least one of the one or more HARQ ACK resources or the one or more SR resources comprises:

dropping the SR resource; and transmitting, using the HARQ ACK resource, a payload of the HARQ ACK resource.

14. The method of claim 1, wherein the collision is between a HARQ ACK resource, associated with a high priority and associated with the first PUCCH format, and an SR resource associated with a low priority and associated with the second PUCCH format, wherein the first PUCCH format is the same as the second PUCCH format; and wherein the action to be performed associated with at least one of the one or more HARQ ACK resources or the one or more SR resources includes transmitting a payload of the HARQ ACK resource using the SR resource or the HARQ ACK resource based at least in part on whether a payload of the SR resource indicates a positive SR.

15. The method of claim 14, wherein transmitting the payload of the HARQ ACK resource using the SR resource or the HARQ ACK resource comprises:

transmitting, using the SR resource, the payload of the HARQ ACK resource based at least in part on the payload of the SR resource indicating the positive SR; or transmitting, using the HARQ ACK resource, the payload of the HARQ ACK resource based at least in part on the payload of the SR resource indicating a negative SR.

16. The method of claim 1, wherein the collision is between a first HARQ ACK resource associated with a low priority, a second HARQ ACK resource associated with a high priority, and an SR resource associated with the high priority; and wherein the action to be performed associated with at least one of the one or more HARQ ACK resources or the one or more SR resources comprises:

multiplexing, on the second HARQ ACK resource, a payload of the first HARQ ACK resource and a payload of the second HARQ ACK resource; and performing another action associated with the second HARQ ACK resource, that includes a multiplexed payload, and the SR resource based at least in part on associating the multiplexed payload with the high priority.

17. The method of claim 1, wherein the collision is between a first HARQ ACK resource associated with a low priority, a second HARQ ACK resource associated with a high priority, and an SR resource associated with the high priority; wherein performing the action associated with at least one of the one or more HARQ ACK resources or the one or more SR resources comprises:

multiplexing a payload of the first HARQ ACK resource and a payload of the second HARQ ACK resource on the second HARQ ACK resource; and performing another action associated with at least one of the second HARQ ACK resource or the SR resource based at least in part on a PUCCH format associated with the second HARQ ACK resource and a PUCCH format associated with the SR resource.

18. The method of claim 1, wherein the collision is between a first HARQ ACK resource associated with a low priority, a second HARQ ACK resource associated with a high priority, and an SR resource associated with the low priority; and wherein the action to be performed associated with at least one of the one or more HARQ ACK resources or the one or more SR resources comprises:

multiplexing, on the second HARQ ACK resource, a payload of the first HARQ ACK resource and a payload of the second HARQ ACK resource; and performing another action associated with the second HARQ ACK resource, that includes a multiplexed payload, and the SR resource based at least in part on associating the multiplexed payload with the high priority.

19. The method of claim 1, wherein the collision is between a first HARQ ACK resource associated with a low priority, a second HARQ ACK resource associated with a high priority, and an SR resource associated with the low priority; and wherein performing the action associated with at least one of the one or more HARQ ACK resources or the one or more SR resources comprises:

multiplexing a payload of the first HARQ ACK resource and a payload of the second HARQ ACK resource on the second HARQ ACK resource; and performing another action associated with at least one of the second HARQ ACK resource or the SR resource based at least in part on a PUCCH format associated with the second HARQ ACK resource and a PUCCH format associated with the SR resource.

20. The method of claim 1, wherein the collision is between a HARQ ACK resource, associated with the first PUCCH format, a first SR resource associated with a high priority, and a second SR resource associated with a low priority; and wherein performing the action associated with at least one of the one or more HARQ ACK resources or the one or more SR resources comprises:

performing a first action associated with a payload of the HARQ ACK resource and a payload of the second SR resource based at least in part on a payload of the first SR resource indicating a negative SR; or performing a second action associated with the payload of the HARQ ACK resource and the payload of the first SR resource based at least in part on the payload of the first SR resource indicating a positive SR.

21. The method of claim 1, wherein the collision is between a HARQ ACK resource, associated with the first PUCCH format, a first SR resource associated with a high priority, and a second SR resource associated with a low priority; and wherein performing the action associated with at least one of the one or more HARQ ACK resources or the one or more SR resources comprises:

dropping the second SR resource based at least in part on a payload of the first SR resource indicating a positive SR.

22. The method of claim 1, wherein the collision is between a HARQ ACK resource, and at least one of: one or more SR resources associated with a high priority, or one or more SR resources associated with a low priority; and wherein the action to be performed associated with at least one of the one or more HARQ ACK resources or the one or more SR resources comprises: appending information to a payload of the HARQ ACK resource to indicate a payload of the one or more SR resources associated with the high priority or the one or more SR resources associated with the low priority based at least in part on whether a payload of an SR resource, of the one or more SR resources associated with the high priority, indicates a positive SR.

23. The method of claim 1, wherein the collision is between a HARQ ACK resource, and at least one of: one or more SR resources associated with a high priority, or one or more SR resources associated with a low priority; and wherein performing the action associated with at least one of the one or more HARQ ACK resources or the one or more SR resources comprises:

appending information, indicating a payload of any positive SRs included in the one or more SR resources associated with the high priority, to a payload of the HARQ ACK resource based at least in part on at least one payload of the one or more SR resources associated with the high priority indicating a positive SR; or appending information, indicating a payload of any positive SRs included in the one or more SR resources associated with the low priority, to a payload of the HARQ ACK resource based at least in part on no payloads of the one or more SR resources associated with the high priority indicating a positive SR.

24. The method of claim 1, wherein performing the action associated with at least one of the one or more HARQ ACK resources or the one or more SR resources comprises:

appending information, associated with at least one SR resource of the one or more SR resources, to a payload of the HARQ ACK resource, wherein a maximum number of bits of the information is based at least in part on N=log 21+K1+K2, wherein N is the maximum number of bits, K1 is a number of high priority SR resources among the one or more SR resources, and K2 is a number of low priority SR resources among the one or more SR resources.

25. The method of claim 1, wherein performing the action associated with at least one of the one or more HARQ ACK resources or the one or more SR resources comprises:

multiplexing a first payload of one or more HARQ ACK resources and a second payload of the one or more SR resources on the one or more HARQ ACK resources or the one or more SR resources; and transmitting, using the one or more HARQ ACK resources or the one or more SR resources, a message including a multiplexed payload, wherein the multiplexed payload includes the first payload and the second payload.

26. The method of claim 1, wherein performing the action associated with at least one of the one or more HARQ ACK resources or the one or more SR resources comprises:

transmitting, using a low priority resource among the one or more HARQ ACK resources or the one or more SR resources, a payload of at least one of the one or more HARQ ACK resources or the one or more SR resources, wherein the low priority resource is transmitted using a power control parameter associated with a high priority resource among the one or more HARQ ACK resources or the one or more SR resources.

27. A user equipment (UE) for wireless communication, comprising:

one or more memories; and one or more processors, coupled to the one or more memories, which are configured, individually or in any combination, to:

identify a collision between one or more hybrid automatic repeat request (HARQ) acknowledgment (ACK) resources and one or more scheduling request (SR) resources, wherein at least one of the one or more HARQ ACK resources and at least one of the one or more SR resources have different priorities; and perform an action, to resolve the collision, associated with at least one of the one or more HARQ ACK resources or the one or more SR resources, wherein the action is selected based at least in part on:

a first physical uplink control channel (PUCCH) format, a priority associated with at least one of the one or more HARQ ACK resources and a quantity of bits of the one or more HARQ ACK resources, and a second PUCCH format, a priority associated with at least one of the one or more SR resources, whether the SR is positive or negative, and a quantity of bits associated with the one or more SR resources.

28. The UE of claim 27, wherein the one or more processors, to identify the collision between the one or more HARQ ACK resources and the one or more SR resources, are configured to:

identify a collision between a HARQ ACK resource, associated with a first priority and the first PUCCH format, and an SR resource associated with a second priority and the second PUCCH format; and wherein the action to be performed associated with at least one of the one or more HARQ ACK resources or the one or more SR resources is based at least in part on at least one of:

whether the first priority is a higher priority than the second priority, the first PUCCH format or the second PUCCH format, or whether a payload of the SR resource indicates a positive SR.

29. The UE of claim 27, wherein the collision is between a HARQ ACK resource associated with a low priority and associated with the first PUCCH format, and an SR resource associated with a high priority and associated with the second PUCCH format, wherein the first PUCCH format is the same as the second PUCCH format; and wherein the one or more processors, to perform the action associated with at least one of the one or more HARQ ACK resources or the one or more SR resources, are configured to:

multiplex a payload of the HARQ ACK resource and a payload of the SR resource on the HARQ ACK resource; and transmit, using the HARQ ACK resource, a multiplexed payload that includes the payload of the HARQ ACK resource and the payload of the SR resource.

30. The UE of claim 27, wherein the collision is between a HARQ ACK resource associated with a low priority and associated with the first PUCCH format, and an SR resource associated with a high priority and associated with the second PUCCH format, wherein the first PUCCH format is the same as the second PUCCH format; and wherein the one or more processors, to perform the action associated with at least one of the one or more HARQ ACK resources or the one or more SR resources, are configured to:

multiplex a payload of the HARQ ACK resource and a payload of the SR resource on the SR resource; and transmit, using the SR resource, a multiplexed payload that includes the payload of the HARQ ACK resource and the payload of the SR resource.

31. The method of claim 1, wherein the action is selected based at least in part on a resource block selection procedure.

* * * * *